United States Patent [19]

Fujii et al.

[11] Patent Number: 5,593,791
[45] Date of Patent: Jan. 14, 1997

[54] MAGNETO-OPTICAL RECORDING MEDIUM AND METHOD OF MANUFACTURING THE SAME

[75] Inventors: Yoshio Fujii; Takashi Tokunaga; Yoshiyuki Nakaki; Kazuhiko Tsutsumi; Kazuo Hashima; Tatsuya Fukami; Yuji Kawano, all of Amagasaki, Japan

[73] Assignee: Mitsubishi Denki Kabushiki Kaisha, Tokyo, Japan

[21] Appl. No.: 543,517

[22] Filed: Oct. 16, 1995

Related U.S. Application Data

[63] Continuation of Ser. No. 45,437, Apr. 8, 1993, abandoned.

[30] Foreign Application Priority Data

| Apr. 10, 1992 | [JP] | Japan | 4-090492 |
| May 18, 1992 | [JP] | Japan | 4-124568 |
| Jun. 25, 1992 | [JP] | Japan | 4-167358 |
| Jul. 20, 1992 | [JP] | Japan | 4-192056 |
| Jul. 20, 1992 | [JP] | Japan | 4-192057 |

[51] Int. Cl.$^6$ .................................................. G11B 5/66
[52] U.S. Cl. .................. 428/694 ML; 428/694 MM; 428/694 EC; 428/694 AH; 428/694 RL; 428/694 DE; 428/694 GR; 428/900; 369/13
[58] Field of Search ............ 428/694 MM, 428/694 ML, 694 EC, 694 GR, 694 AH, 694 RL, 694 DE, 900; 369/13

[56] References Cited

U.S. PATENT DOCUMENTS

| 4,717,628 | 1/1988 | Takahashi et al. | 428/457 |
| 4,753,853 | 6/1988 | Sato et al. | 428/679 |
| 4,878,132 | 10/1989 | Aratani et al. | 360/59 |
| 4,908,809 | 3/1990 | Tadokoro et al. | 369/13 |
| 4,977,019 | 12/1990 | Schaefer | 428/317.5 |
| 5,053,288 | 10/1991 | Hashimato et al. | 428/694 AH |
| 5,309,427 | 5/1994 | Matsumoto | 369/275.2 |

FOREIGN PATENT DOCUMENTS

| 0258978 | 3/1988 | European Pat. Off. . |
| 352548 | 1/1990 | European Pat. Off. . |
| 382859 | 8/1990 | European Pat. Off. . |
| 2-121103 | 5/1990 | Japan . |

OTHER PUBLICATIONS

T. Tokunaga et al., *Study of Interface Wall Energy in Exchange–Coupled Double–Layer Film*, Journal of Applied Physics, vol. 67, No. 9, Part IIA, pp. 4417–4419 (May 1, 1990).

J. Saito et al., "Direct Overwrite by Light Power Modulation on Magneto–Optical Multi–Layered Media", *Japanese Journal of Applied Physics*, vol. 26, 1987, Supplement 26–4, pp. 155–159.

T. Fukami et al., "Novel Direct Overwriting Technology for Magneto–Optical Disks by Exchange–Coupled RE–TM Quadrilayered Films", *Journal of Applied Physics*, vol. 67, No. 9, Part IIA, May 1, 1990, pp. 4415–4416.

*Primary Examiner*—Leszek Kiliman
*Attorney, Agent, or Firm*—Burns, Doane, Swecker & Mathis, LLP

[57] ABSTRACT

A magneto-optical recording medium wherein an initializing layer is covered with a resin layer for dissipating heat from the initializing layer thereby to prevent signal degradation at high recording power and thus excellent in record/reproduce repetition times, and the initializing layer is compositionally modulated thereby to broaden allowable ranges for the recording/reproducing light intensity and for the external magnetic field, besides the composition of a first or a second magnetic layer is controlled thereby to enhance recording sensitivity, and the exchange-coupling force between the first and second magnetic layers or the magnetic field strengthe to reverse the magnetization of the first magnetic layer is controlled thereby to enhance the recording/reproducing characteristics.

9 Claims, 39 Drawing Sheets

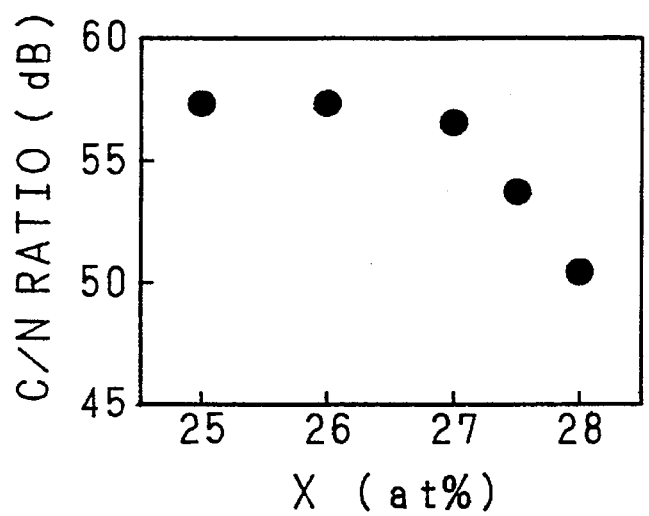
Fig. 25(a) SECOND LAYER THICKNESS =300Å
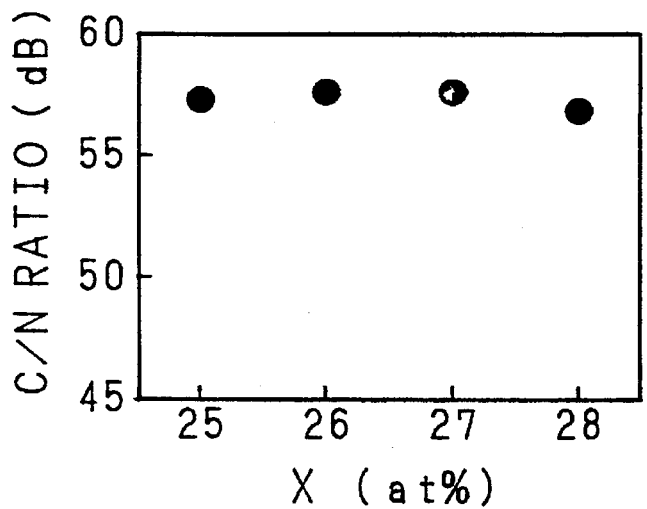
Fig. 25(b) SECOND LAYER THICKNESS =500Å
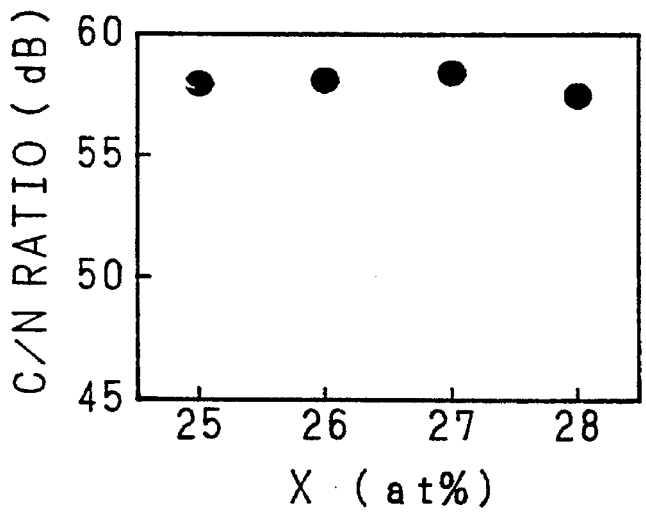
Fig. 25(c) SECOND LAYER THICKNESS =700Å

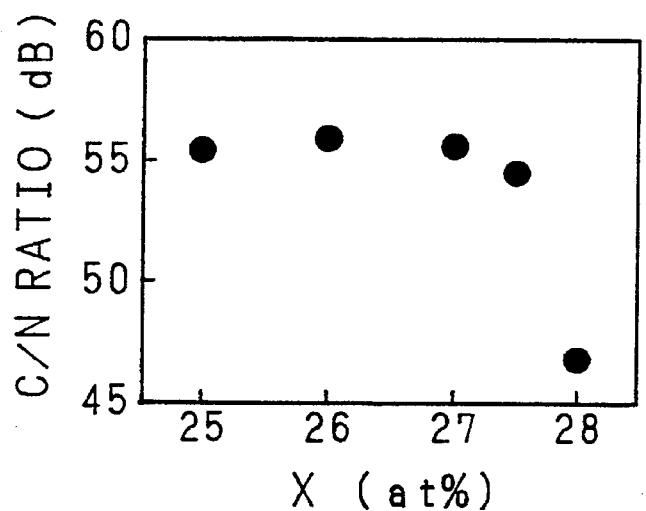
Fig. 29(a) SECOND LAYER THICKNESS =300Å
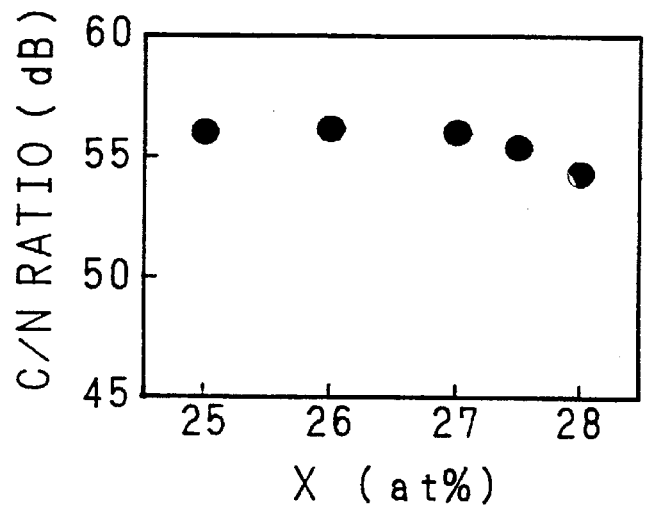
Fig. 29(b) SECOND LAYER THICKNESS =500Å
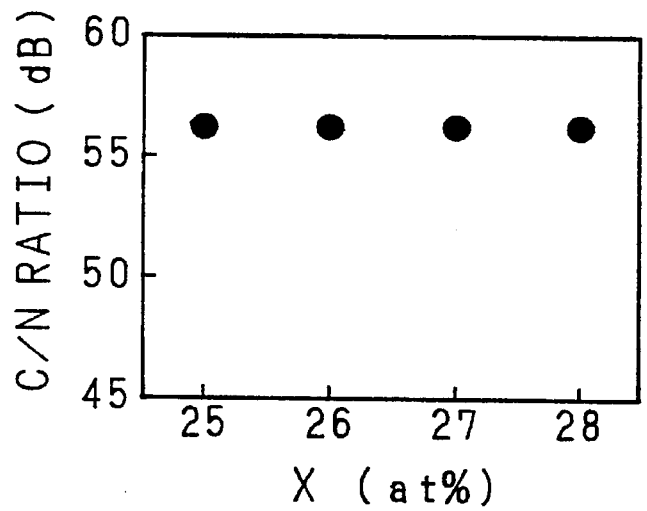
Fig. 29(c) SECOND LAYER THICKNESS =700Å

SECOND LAYER THICKNESS =300Å

SECOND LAYER THICKNESS =500Å

SECOND LAYER THICKNESS =700Å

FIRST LAYER THICKNESS = 200Å

FIRST LAYER THICKNESS = 300Å

ORDINARY OVERWRITING

LOW POWER RECORDING

ORDINARY OVERWRITING

LOW POWER RECORDING

ORDINARY OVERWRITING

LOW POWER RECORDING

MAGNETO-OPTICAL RECORDING MEDIUM AND METHOD OF MANUFACTURING THE SAME

This application is a continuation of application Ser. No. 08/045,437, filed Apr. 8, 1993, now abandoned.

BACKGROUND OF THE INVENTION

1. Field of the Invention

The present invention relates to a magneto-optical recording medium using an exchange-coupled, multilayered magnetic film and capable of direct overwriting by light power modulation, and to a method of manufacturing the same.

2. Description of the Related Art

FIG. 1 is a schematic diagram showing the structure of a magneto-optical recording medium of prior art, such as disclosed in "Journal of Applied Physics," vol 67, No. 9, pp. 4415–4416, May 1, 1990. In the figure, the reference numeral 10 is a light beam emitted from a semiconductor laser or the like and focused by a lens; 20 is an external magnetic field generator for generating a biasing magnetic field Hb; 30 is a transparent substrate made of glass or plastic material; 1 to 5 are first to fifth magnetic layers exchange-coupled with one another; and 6 and 7 are dielectric layers. In the magnetic layers 1 to 5, adjacent layers are coupled with each other by the exchange forces acting between them, i.e., the forces by which the directions of magnetization (sub-lattice magnetization) of the rare earth or transition metals in the magnetic layers tend to align in parallel with each other.

The mechanism of direct overwriting by light power modulation will now be described. FIG. 2 is a diagram showing the intensity of the light beam 10 which is modulated in three stages for writing $P_{HIGH}$, $P_{LOW}$) and reading ($P_{READ}$). In $P_{READ}$, the light beam intensity is small and the magnetization states of the magnetic layers do not change. On the other hand, in $P_{LOW}$ and $P_{HIGH}$, the light beam intensity is large compared to that for $P_{READ}$, so that the temperature of the recording medium reaches maximum values $T_{LOW}$ and $T_{HIGH}$, respectively; during the subsequent cooling, the magnetization state changes, recording a "1" or a "0". Zeros are recorded by "low power process", while ones are recorded by "high power process".

FIG. 3 is a schematic diagram showing the low power process and high power process in relation to the temperature of the recording medium and the direction of transition metal sub-lattice magnetization of each magnetic layer. In the figure, Troom indicates room temperature, and $T_{c1}$, $T_{c2}$, $T_{c3}$, and $T_{c4}$ are the Curie temperatures for the first to fourth magnetic layers 1 to 4, respectively. After forming the film on the recording medium, the directions of transition metal sub-lattice magnetization of the second to fourth magnetic layers 2 to 4 are oriented upward only once at the beginning, and the biasing magnetic field Hb is formed downward. In the figure, the arrows indicate the directions of transition metal sub-lattice magnetization.

When a light beam is projected in the low power process, the temperature of the medium rises to $T_{LOW}$ which is in the vicinity of $T_{c1}$. At this time, there occurs no change in the directions of transition metal sub-lattice magnetization of the second and fourth magnetic layers 2 and 4, the directions remaining oriented upward. During the sub-sequent cooling, the direction of transition metal sub-lattice magnetization of the first magnetic layer 1 is aligned upward by the exchange forces operating from the second magnetic layer 2, thus recording a "0".

On the other hand, when a light beam is projected in the high power process, the medium temperature rises to $T_{HIGH}$ which is in the vicinity of $T_{c2}$. At this time, the direction of transition metal sub-lattice magnetization is oriented upward only in the fourth magnetic layer 4. During the subsequent cooling, the direction of transition metal sub-lattice magnetization of the second magnetic layer 2 is oriented downward because of the magnetic field Hb generated by the external magnetic field generator 20, and then, the direction of transition metal sub-lattice magnetization of the first magnetic layer 1 is aligned downward by the exchange forces operating from the second magnetic layer 2, as in the case of the low power process. Thereafter, near the room temperature, the direction of transition metal sub-lattice magnetization of the second magnetic layer 2 is aligned upward by the exchange forces operating from the third magnetic layer 3, the so-called initialization process. However, no reversal by exchange forces occurs in the transition metal sub-lattice magnetization of the first magnetic layer 1, so that the magnetization direction remains oriented downward, thus recording a "1".

Next, the initialization process of aligning the magnetization of the second magnetic layer 2 back into the initial upwardly oriented state will be described in further detail. During the cooling from the high power process, the direction of magnetization of the third magnetic layer 3 is aligned with the direction of magnetization of the fourth magnetic layer 4 because of exchange forces, thus upwardly orienting the transition metal sub-lattice magnetization of the third magnetic layer 3.

Next, the direction of magnetization of the second magnetic layer 2 is aligned with the direction of magnetization of the third magnetic layer 3 because of exchange forces, thus upwardly orienting the transition metal sub-lattice magnetization of the second magnetic layer 2 to return to its initial state. The initialization process is thus completed. Since the fourth magnetic layer 4 works always to initialize the direction of magnetization of the second magnetic layer 2 to upward orientation to ready it for the next recording, the fourth magnetic layer 4 is also called an initializing layer.

As described above, to realize direct overwriting, the magnetization of the initializing layer 4 must always be retained in the same orientation and must not be reversed in any write or read process including the high power process. However, it has been found that the direction of magnetization of the initializing layer 4 may become reversed when the light power $P_{HIGH}$ in the high power process is excessively high.

FIG. 4 shows the dependence of the carrier-to-noise (C/N) ratio of a reproduced signal on the power $P_{HIGH}$ of a recording light beam. As can be seen, when $P_{HIGH}$ exceeds 10 mW, the C/N ratio abruptly drops. When the initializing layer 4 was observed under a polarizing microscope, it was found that there had occurred magnetization reversal in part of the initializing layer in the recording area. This was because the magnetic layer temperature had risen nearly to the Curie temperature for the initializing layer due to excessive $P_{HIGH}$, causing magnetization reversal in the initializing layer 4.

FIG. 5 is a diagram showing the bit error rate of a reproduced signal plotted against the record/reproduce repetition times when recording and reproduction processes were repeatedly performed. As can be seen, the bit error rate shows an increase when the record/reproduce repetition times approximately exceeds 1×10⁴. When the magneto-optical recording medium with an increased bit error rate was examined, it was found that magnetization reversal had occurred in the initializing layer 4. It is considered that the reversal or fluctuation of the magnetization direction of the initializing layer 4, which would present no problem in one recording/reproduction, was exaggerated by repeated recording and reproduction to a point where such magnetization reversal occurred in the initializing layer 4 as to lead to an increase in the error rate.

As described above, with the magneto-optical recording medium of FIG. 1, it has been found that the upper limit of the recording light beam power has to be set at a relatively low value, and in some applications, there is a limit to the number of record/reproduce repetition times, because of the problem of magnetization reversal of the initializing layer 4 inherent to the light-modulation direct overwritable magneto-optical recording medium.

The four magnetic layers used in the above recording medium have the magnetic characteristics and film thicknesses shown in Table 1.

TABLE 1

|  | Film material | Coercivity (KOe) | Dominant sub-lattice | Curie temperature (°C.) | Film thickness (Å) |
| --- | --- | --- | --- | --- | --- |
| 1st layer | TbFeCo | 15 | TM | 200 | 600 |
| 2nd layer | GdDyFeCo | 3 | RE | 260 | 1400 |
| 3rd layer | TbFe | 3 | TM | 120 | 200 |
| 4th layer | TbCo | 8 | RE | >300 | 400 |

As shown in Table 1, the total film thickness is 2600 Å, and TM means that the transition metal sub-lattice magnetization is greater than the rare earth metal sub-lattice magnetization, while RE means that the rare earth metal sub-lattice magnetization is greater than the transition metal sub-lattice magnetization.

Thus, the prior art magneto-optical disk has the problem that because of the large total thickness of the magnetic layers means, a large laser light power is required for recording, resulting in reduced recording density. The prior art has the further problem that the complicated mechanism imposes a limit to the allowable range of the external magnetic field to be applied when overwriting, making it difficult to obtain a sufficient signal-to-noise ratio.

FIG. 6 is a schematic diagram showing the structure of a prior art magneto-optical recording medium, as disclosed in Japanese Patent Application No.2-121103, which has a magnetic layer for controlling the exchange forces. As shown, the recording medium has a fifth magnetic layer 15 interposed between the first and second magnetic layers 1 and 2, the fifth layer 15 being formed from a rare earth dominant metal film and having the ability to control the exchange forces. When performing direct overwriting by light power modulation on the recording medium, since the direction of sub-lattice magnetization of the second magnetic layer 2 must be prealigned in a prescribed direction, an auxiliary magnetic field generator 40 capable of generating a magnetic field as great as several kOe is needed for initialization, in addition to the external magnetic field generator 20.

In the above magneto-optical recording medium, in order to reduce the auxiliary magnetic field from the auxiliary magnetic force generator 40, which causes a problem that the system becomes complicated in construction, the thickness of the second magnetic layer 2 should be reduced. Reducing the thickness of the second layer 2 results in reduction of the allowable margin for the formation of the first and second magnetic layers 1 and 2, causing the problem that stable production is difficult.

The above prior art recording medium has the further problem that since no particular limits are imposed on the reversal magnetic field for the first magnetic layer 1 as long as it is within the range that permits retention of recorded information, good recording and reproducing characteristics cannot be obtained when the reversal magnetic field for the first magnetic layer 1 is extremely small.

SUMMARY OF THE INVENTION

The present invention has been made to overcome the above enumerated problems, and it is a first object of the invention to provide a magneto-optical recording medium in which a resin layer is provided to absorb and transfer heat from the initializing layer, thereby preventing signal degradation at high recording power and ensuring excellent record/reproduce repetition characteristics.

It is a second object of the invention to provide a method of manufacturing a magneto-optical recording medium, in which the amount of resin used for forming the resin layer is reduced to reduce the manufacturing cost and the initializing layer can be covered uniformly with the resin layer.

It is a third object of the invention to provide a magneto-optical recording medium and a method of manufacturing the same, in which a magnetic film with its composition modulated in a direction perpendicular to its magnetic layer is used as the initializing layer, thereby widening the allowable range for both the light intensity and external magnetic field strength that does not cause reversal of the sub-lattice magnetization of the initializing layer, and thus ensuring stable direct overwriting by light power modulation.

It is a fourth object of the invention to provide a magneto-optical recording medium having an increased recording sensitivity by controlling the rare earth content of a second magnetic layer and reducing the thickness of the second magnetic layer.

It is a fifth object of the invention to provide a magneto-optical recording medium that provides a wide allowable range for the external magnetic field strength by controlling the composition of the first magnetic layer so that its compensation temperature falls in the vicinity of the temperature that causes the transfer of magnetization from the second magnetic layer to the first magnetic layer.

It is a sixth object of the invention to provide a magneto-optical recording medium that offers excellent recording and reproducing characteristics by controlling the magnetic characteristics of an intermediate layer provided to control the exchange forces between the first and second magnetic layers.

It is a seventh object of the invention to provide a magneto-optical recording medium that offers excellent recording and reproducing characteristics by controlling the reversal magnetic field for the first magnetic layer or by providing a magnetic layer for controlling the exchange forces acting between the first and second magnetic layers.

The above and further objects and features of the invention will more fully be apparent from the following detailed description with accompanying drawings.

BRIEF DESCRIPTION OF THE DRAWINGS

FIG. 25(a) is a graph showing the relationship between the C/N ratio and the rare earth metal content when the thickness of the second magnetic layer in the magneto-optical recording medium of Embodiment 27 is 300 Å;

FIG. 25(b) is a graph showing the relationship between the C/N ratio and the rare earth metal content when the thickness of the second magnetic layer in the magneto-optical recording medium of Embodiment 27 is 500 Å;

FIG. 25(c) is a graph showing the relationship between the C/N ratio and the rare earth metal content when the thickness of the second magnetic layer in the magneto-optical recording medium of Embodiment 27 is 700 Å;

FIG. 29(a) is a graph showing the relationship between the C/N ratio and the rare earth metal content when the thickness of the second magnetic layer in the magneto-optical recording medium of Embodiment 28 is 300Å;

FIG. 29(b) is a graph showing the relationship between the C/N ratio and the rare earth metal content when the thickness of the second magnetic layer in the magneto-optical recording medium of Embodiment 28 is 500Å;

FIG. 29(c) is a graph showing the: relationship between the C/N ratio and the rare earth metal content when the thickness of the second magnetic layer in the magneto-optical recording medium of Embodiment 28 is 700Å;

DESCRIPTION OF THE PREFERRED EMBODIMENTS

The preferred embodiments of the invention will now be described below with reference to the accompanying drawings.

Embodiment 1

Figure 7:
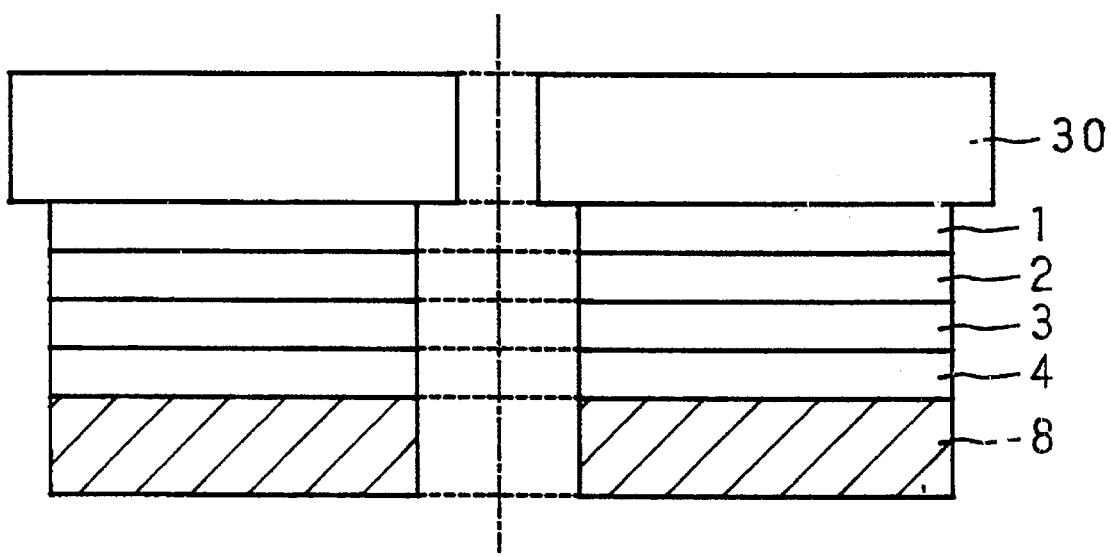
FIG. 7 is a cross sectional view of a portion of a magneto-optical recording medium according to Embodiment 1 of the invention.

FIG. 7 shows a cross sectional view of a magneto-optical recording medium according to one embodiment of the invention. In FIG. 7, the reference numeral 30 designates a transparent substrate made of glass or plastic material, and the numerals 1 to 4 indicate four magnetic layers coupled with one another by exchange forces, the first magnetic 1, the second magnetic layer 2, the third magnetic layer 3, and the initializing layer 4 (fourth magnetic layer) being formed one on top of another in this order, plus a resin layer 8. The detailed composition of each layer is shown below.

Transparent substrate 30: Polycarbonate substrate with guide groove, outside radium 65 mm, center hole radius 7.5 mm, thickness 1.2 mm, effective recording/reproducing area from radius 30 to 60 mm.

1st magnetic layer 1: $Tb_{24}Fe_{72}Co_4$, ternary amorphous alloy thin film

2nd magnetic layer 2: $Dy_{25}Fe_{45}Co_{30}$, ternary amorphous alloy thin film 3rd magnetic layer 3: $Tb_{18}Fe_{82}$, binary amorphous alloy thin film Initializing layer 4: $Tb_{30}Co_{70}$, binary amorphous alloy thin film Resin layer 8: Ultraviolet-curing resin In fabricating the magneto-optical recording medium of Embodiment 1, the first magnetic layer 1, the second magnetic layer 2, the third magnetic layer 3, and the initializing layer 4, which together constitute a recording layer, are sequentially formed by magnetron sputtering over a concentric area from radius 25 to 62 mm of the transparent substrate 30, after which the resin layer 8 is formed by spin coating in contacting relationship to the initializing layer 4, the resin layer 8 then being cured by subjection to ultraviolet radiation, to complete the structure shown in FIG. 7.

Figure 8:
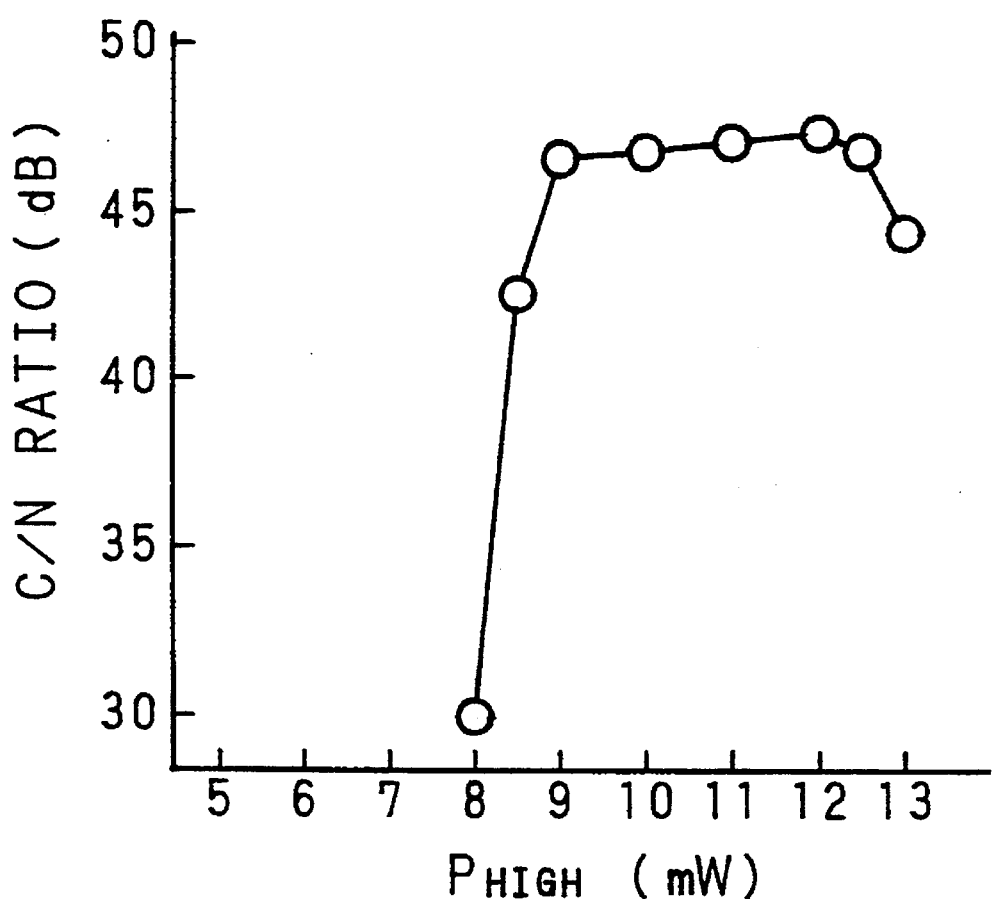
FIG. 8 is a graph showing the relationship between the C/N ratio and the recording light beam power $P_{HIGH}$ for the magneto-optical recording medium of Embodiment 1.

FIG. 8 is a graph showing the dependence of the C/N ratio of a reproduced signal on the recording light beam power $P_{HIGH}$ in the magneto-optical recording medium of Embodiment 1. In the prior art structure not provided with the resin layer 8, the C/N ratio dropped abruptly when $P_{HIGH}$ exceeded 10 mW; on the other hand, in the structure of Embodiment 1 having the resin layer 8, the C/N ratio does not drop until $P_{HIGH}$ exceeds 12.5 mW, as shown by the graph.

This is because the heat of the initializing layer 4, resulting from the heating by the recording light beam, has been transferred and absorbed into the, resin layer 8, thereby suppressing the temperature rise it, the initializing layer 4 and thus allowing an increase in $P_{HIGH}$ without causing degradation of characteristics, due to reverse magnetization of the initializing layer.

Figure 5:
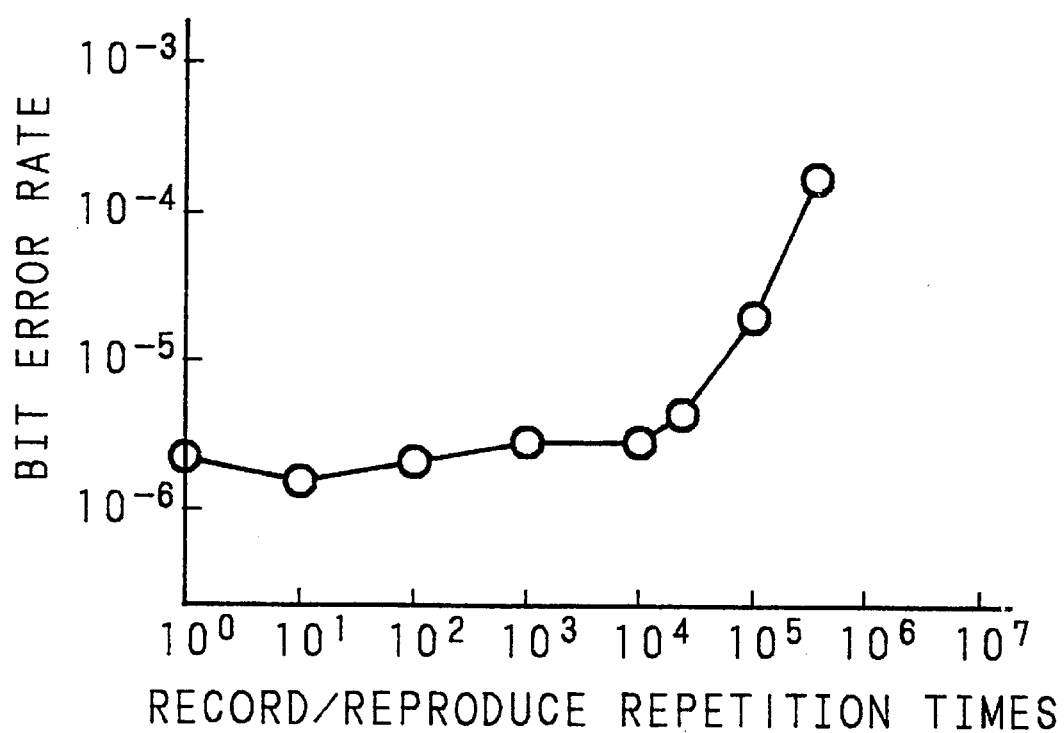
FIG. 5 is a graph showing the relationship between the bit error rate and the record/reproduce repetition times for the prior art magneto-optical recording medium.
Figure 6:
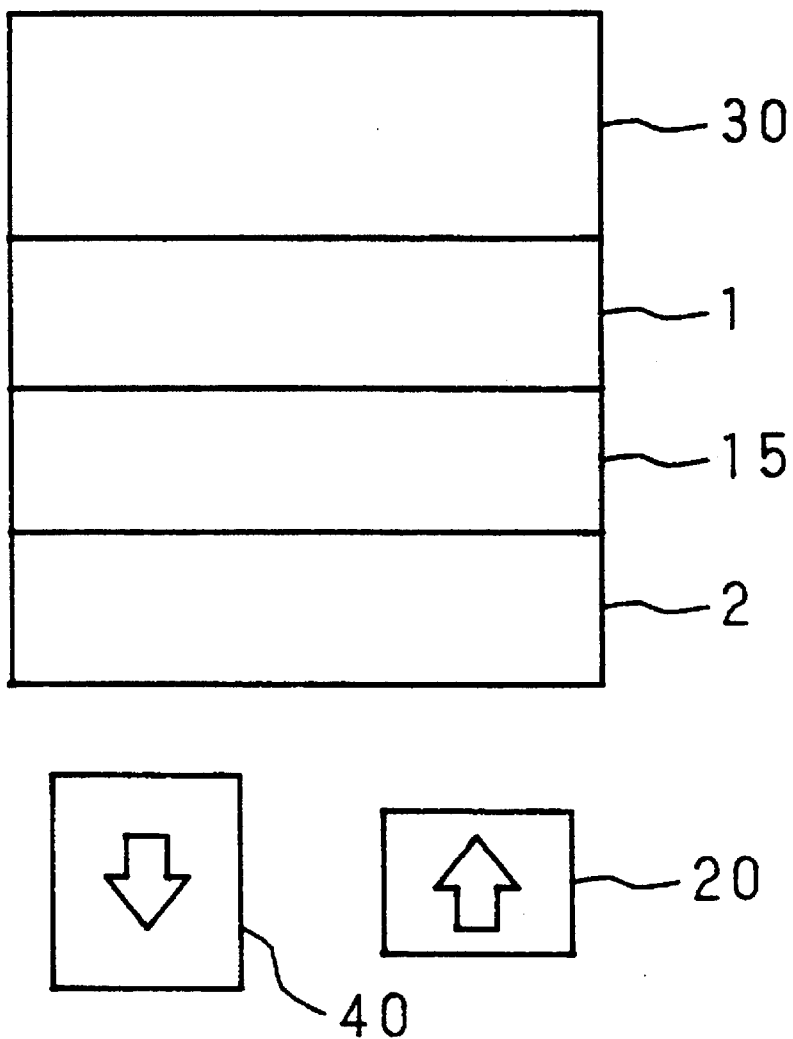
FIG. 6 is a cross sectional view of a portion of another prior art magneto-optical recording medium having a magnetic layer for controlling the exchange forces between a first and a second magnetic layer.
Figure 9:
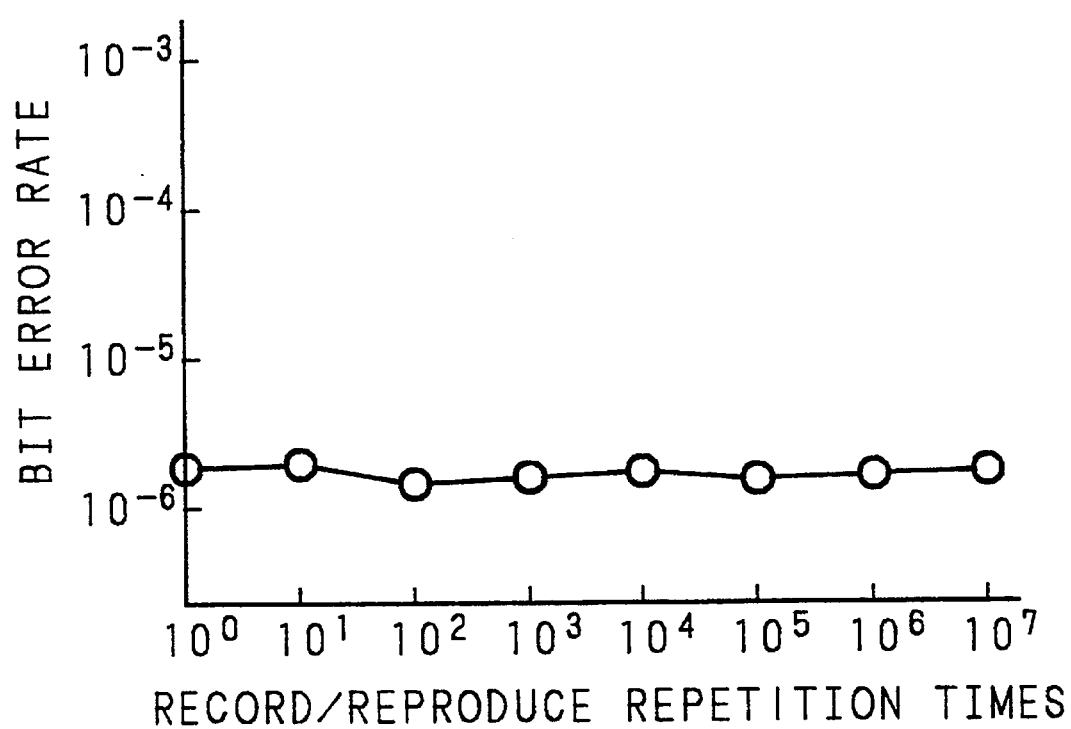
FIG. 9 is a graph showing the relationship between the bit error rate and the record/reproduce repetition times for the magneto-optical recording medium of Embodiment 1.

FIG. 9 is a graph plotting the bit error rate caused in a reproduced signal against the record/reproduce repetition times when recording and reproducing processes were repeatedly performed on the magneto-optical recording medium of Embodiment 1. In the prior art structure not provided with the resin layer 8, an increase in the bit error rate was observed when the record/reproduce repetition times exceeded $1\times10^4$ approximately, as shown in FIG. 5; on the other hand, in the structure of Embodiment 1 having the resin layer 8, no increase in the error rate was observed even at the record/reproduce repetition times of $1\times10^7$.

When the initializing layer 4 of the above recording medium was examined under a polarizing microscope, the magnetization of the repeated recorded and reproduced area of the initializing layer 4 was oriented in the same direction and no reverse magnetization of the initializing layer 4 was observed that could lead to an increase in the error rate as a result of repeated recording and reproduction. For the resin layer 8, the minimum thickness that can achieve the effect of the invention obtained by preventing the overheating of the initializing layer 4 is 0.3 μm, and a thicker resin layer 8 will further enhance the effect of the invention.

Embodiment 2

Figure 10:
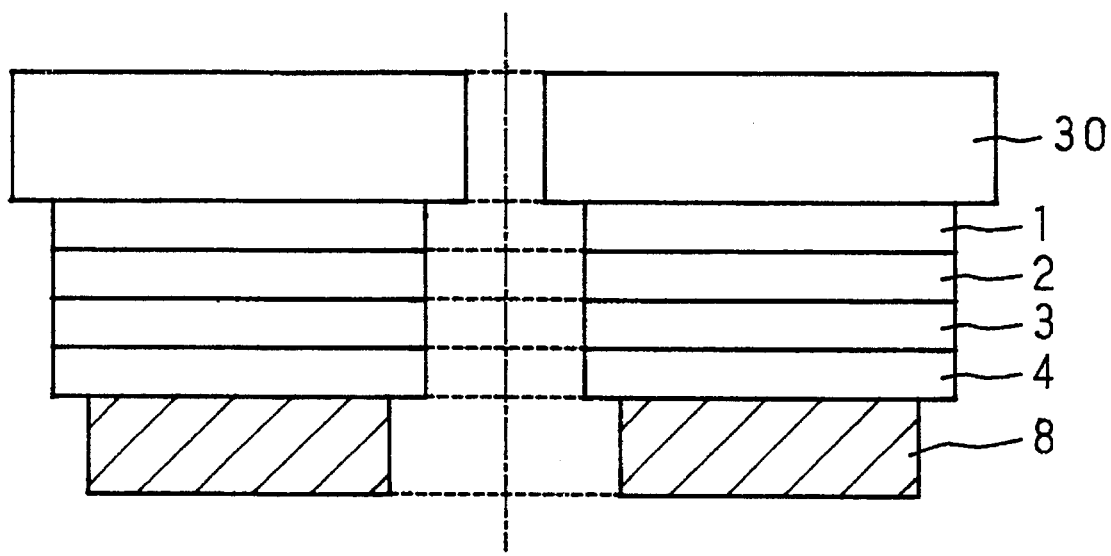
FIG. 10 is a cross sectional view of a portion of a magneto-optical recording medium according to Embodiment 2 of the invention.
Figure 11:
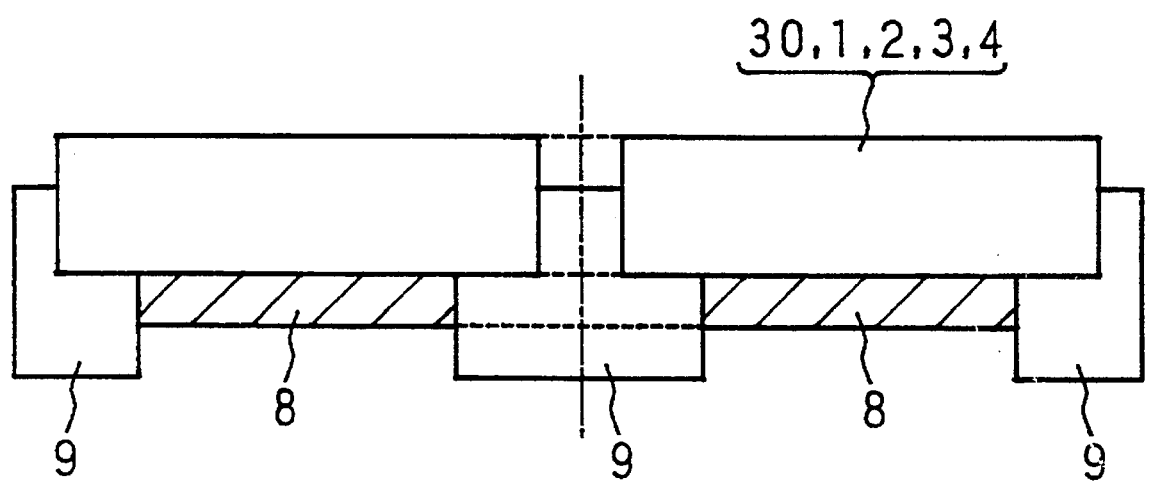
FIG. 11 is a cross sectional view for explaining a manufacturing process for the magneto-optical recording medium of Embodiment 2.

FIG. 10 is a cross sectional view illustrating Embodiment 2 of the invention. In Embodiment 2, a metal mask 9 is formed in encircling relationship to the concentric recording/reproducing area from radius 30 to 60 mm of the magneto-optical recording medium of Embodiment 1, leaving a concentric area from radius 29.5 to 60.5 mm uncovered as shown in FIG. 11, and then, the uncovered concentric area is coated with a resin layer 8 which is cured thereon.

The manufacturing process of Embodiment 2 serves to reduce the amount of resin used for the formation of the resin layer 8 without ruining the effect of the invention as described in Embodiment 1, and yet ensures production of magneto-optical recording media having an extremely stable resin thickness and shape and a stable appearance quality.

Embodiment 3

Figure 12:
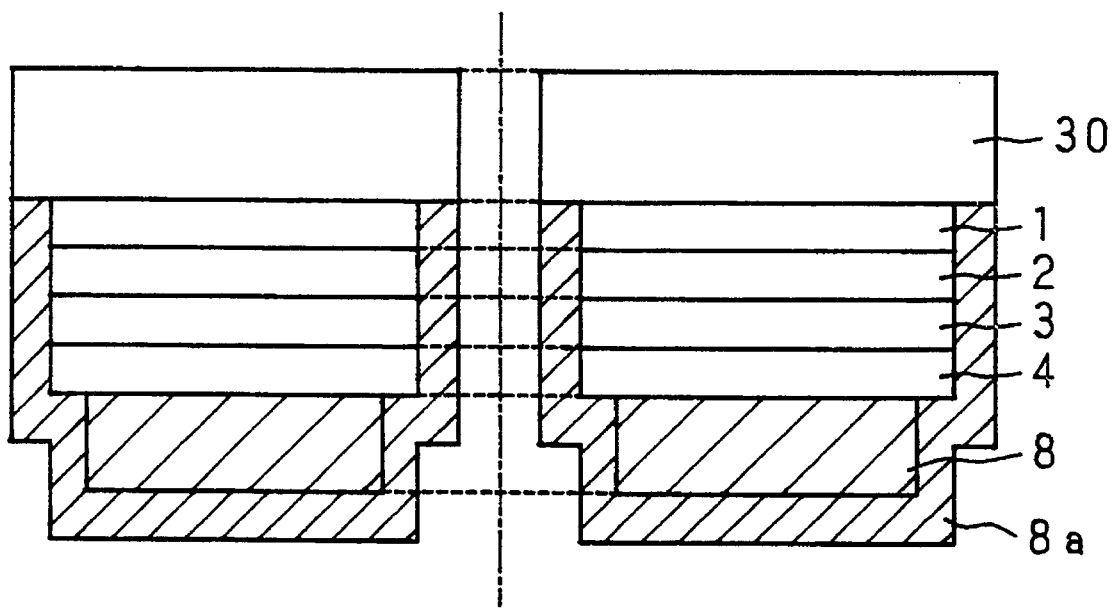
FIG. 12 is a cross sectional view of a portion of a magneto-optical recording medium according to Embodiment 3 of the invention.

FIG. 12 is a cross sectional view of a magneto-optical recording medium manufactured in accordance with the manufacturing process of Embodiment 3 of the invention. According to Embodiment 3, after the resin layer 8 has been formed in accordance with the manufacturing process of Embodiment 2, an additional resin layer is deposited and cured thereon, thereby forming a second resin layer 8a. In order to obtain the previously mentioned effect of the invention, the initializing layer 4 on the recording/reproducing area must be completely covered with the resin layer 8 formed in intimate contact therewith. According to Embodiment 3, in case there occur in the manufacturing process of Embodiment 2 any imperfections in covering the recording/reproducing area with the resin layer 8 due to uneven or imperfect coating, for example, such imperfections can be corrected by forming the second resin layer 8a covering any portions left uncoated. Embodiment 3 thus has the effect of improving the yields in the magneto-optical recording medium manufacturing process of the invention.

Furthermore, the magneto-optical recording medium manufactured in accordance with the process of Embodiment 3 has a thicker resin layer on its recording/reproducing area than on other areas, which further enhances the effect of the invention obtained by suppressing the overheating of the initializing layer 4.

Embodiment 4

Figure 13:
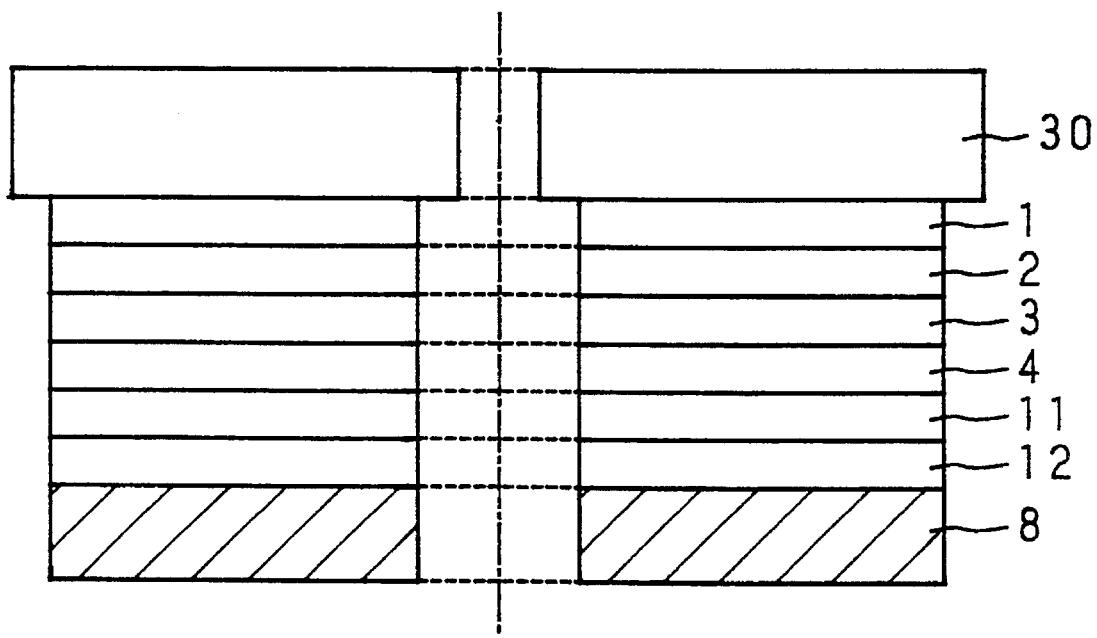
FIG. 13 is a cross sectional view of a portion of a magneto-optical recording medium according to Embodiment 4 of the invention.

FIG. 13 is a cross sectional view illustrating Embodiment 4 of the invention. The recording layer of Embodiment 4 further comprises a metal thin-film layer 12 formed from a metal, such as Au, Ag, Al, Cu, or Ni, or any of their alloys, and a dielectric layer 11 formed from a material such as $Ta_2O_5$, SiN, AlN, AlSiN, SiAlON, SiO, $SiO_2$, or GeN, the layers 12 and 11 being positioned in this order when viewed from the side of the resin layer 8.

In the magneto-optical recording medium of the structure of Embodiment 4, the heat energy given to the initializing layer 4 during recording is quickly transferred via the dielectric layer 11 to the metal thin-film layer 12, and further to the resin layer 8, thereby preventing the heat energy from being accumulated in the metal thin-film layer 12. Embodiment 4 thus has the effect of further enhancing the effect of the invention obtained by suppressing the overheating of the initializing layer 4.

Embodiment 5

Figure 14:
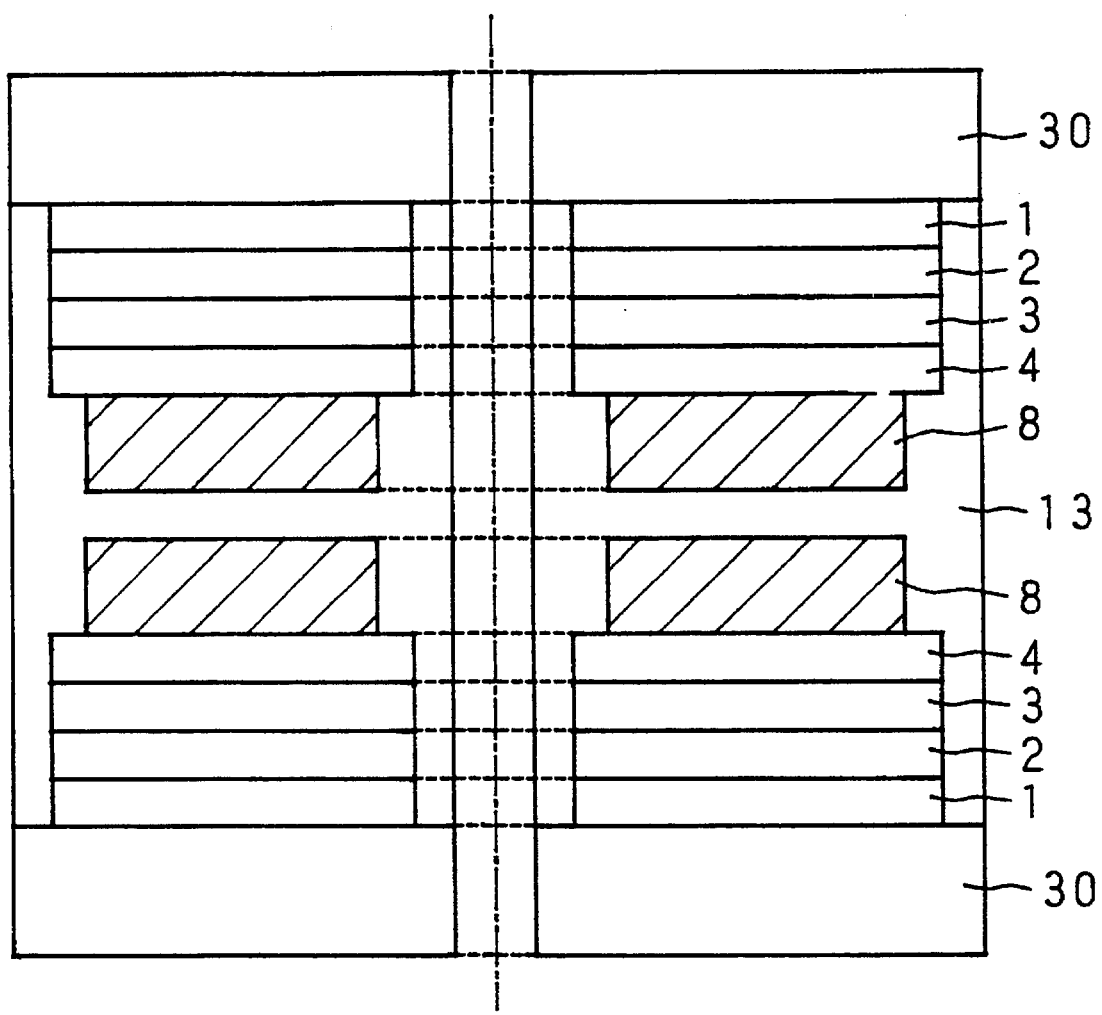
FIG. 14 is a cross sectional view for explaining a process for manufacturing a magneto-optical recording medium according to Embodiment 5 of the invention.

FIG. 14 is a cross sectional view illustrating Embodiment 5 of the invention. In Embodiment 5, the structure of the magneto-optical recording medium of the invention is applied to the construction of a double-sided magneto-optical recording medium having initializing layers. In manufacturing the magneto-optical recording medium of Embodiment 5, two magneto-optical recording media are first fabricated in accordance with the method of Embodiment 2, and then, the two media, with their resin layers 8 facing each other, are bonded together using an adhesive layer 13 such as hot-melt adhesive or adhesive tape.

The structure of Embodiment 5 can provide the previously mentioned effect of the invention even if the magneto-optical recording medium is of double-sided type. The adhesive layer 13 may be formed only on the inner and outer circumferential areas not coated with the resin layers 8; in this case also, the same effect of the invention can be obtained.

Embodiment 6

Figure 15:
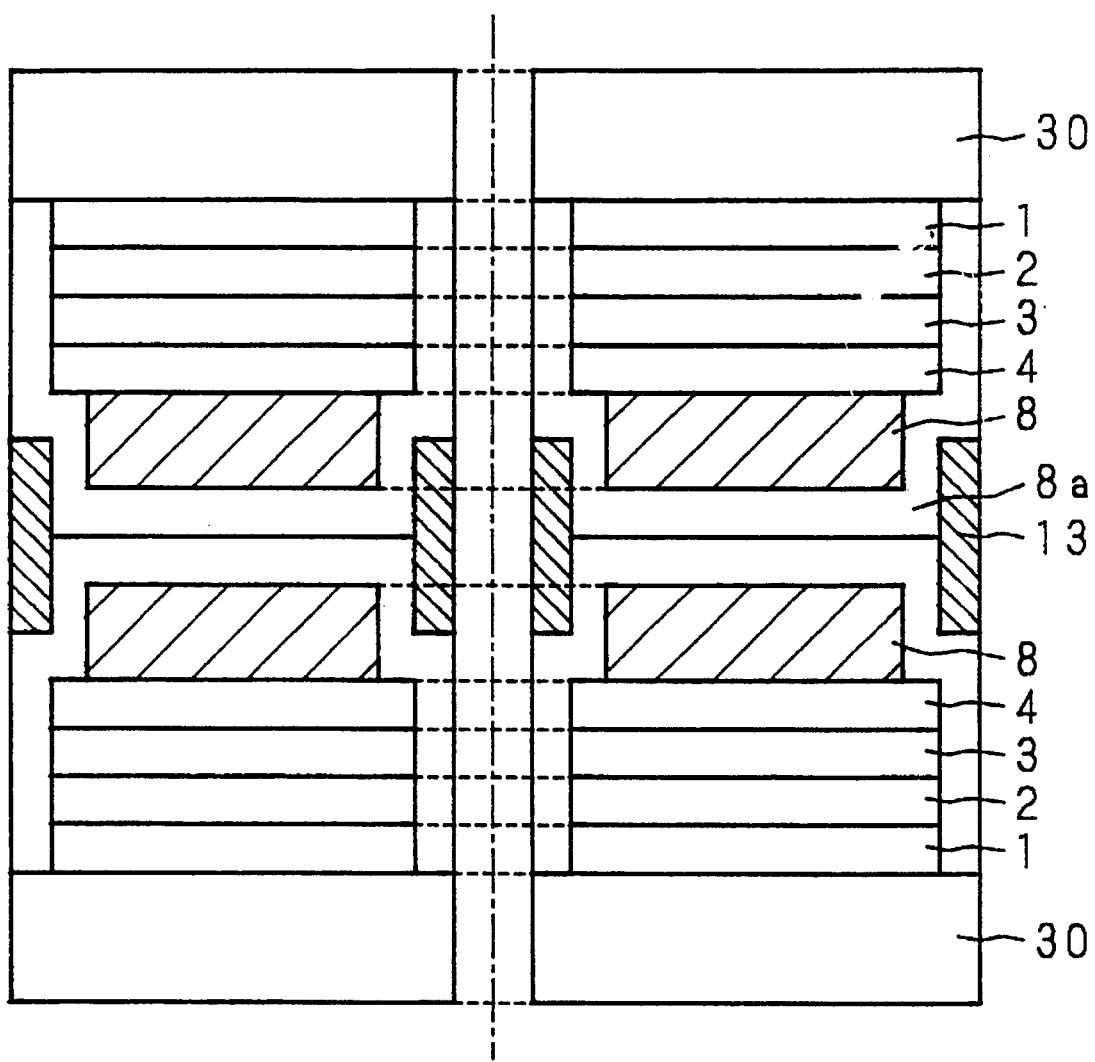
FIG. 15 is a cross sectional view for explaining a process for manufacturing a magneto-optical recording medium according to Embodiment 6 of the invention.

FIG. 15 is a cross sectional view illustrating Embodiment 6 of the invention. In Embodiment 6, two magneto-optical recording media fabricated in accordance with Embodiment 3 are bonded together, with their resin layers 8a facing each other, by interposing adhesive layers 13, such as hot-melt adhesive or adhesive tape, applied to the inner and outer circumferential surfaces.

Embodiment 7

Figure 16:
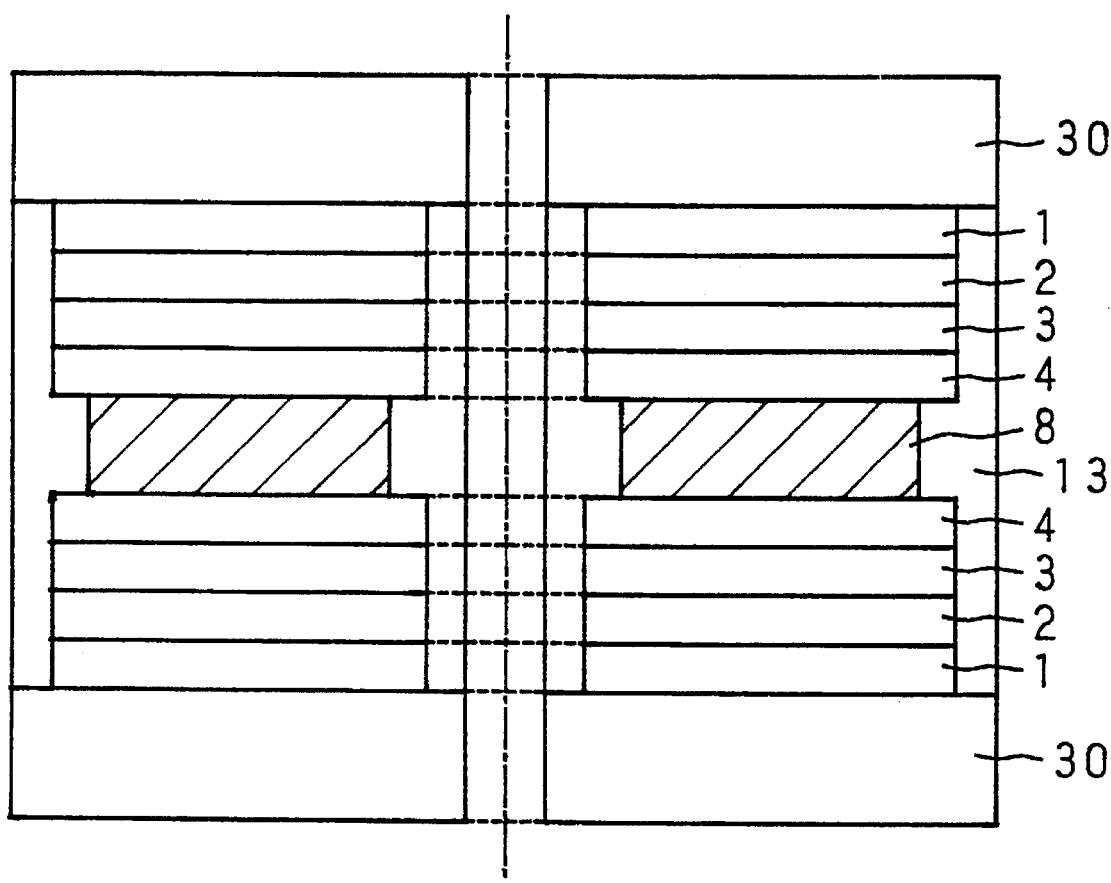
FIG. 16 is a cross sectional view for explaining a process for manufacturing a magneto-optical recording medium according to Embodiment 7 of the invention.

FIG. 16 is a cross sectional view illustrating Embodiment 7 of the invention. In Embodiment 7, the resin layers 8 separately provided in both sides of the magneto-optical recording medium of Embodiment 5 is replaced by a single resin layer 8 which is shared by the two recording medium sheets bonded together. The magneto-optical recording medium of the structure of Embodiment 7 is fabricated in the following manner.

First, an epoxy resin layer 8 is deposited on either one of two magneto-optical recording media fabricated in accordance with Embodiment 2. During this process, the resin deposition rate is controlled so that the deposited thickness of the resin layer 8, of the total thickness of deposition, becomes 0.3 μm or over. Next, before the resin layer 8 cures, the two magneto-optical recording media are placed with their recording layers facing each other, and pressure is applied to press them together.

At this time, an adhesive layer 13 is formed, for example, using hot-melt adhesive or adhesive tape of the amount that can provide the required bonding strength. As with Embodiment 5, the structure of Embodiment 7 also offers the same effect of the invention as previously described.

Embodiment 8

Figure 17:
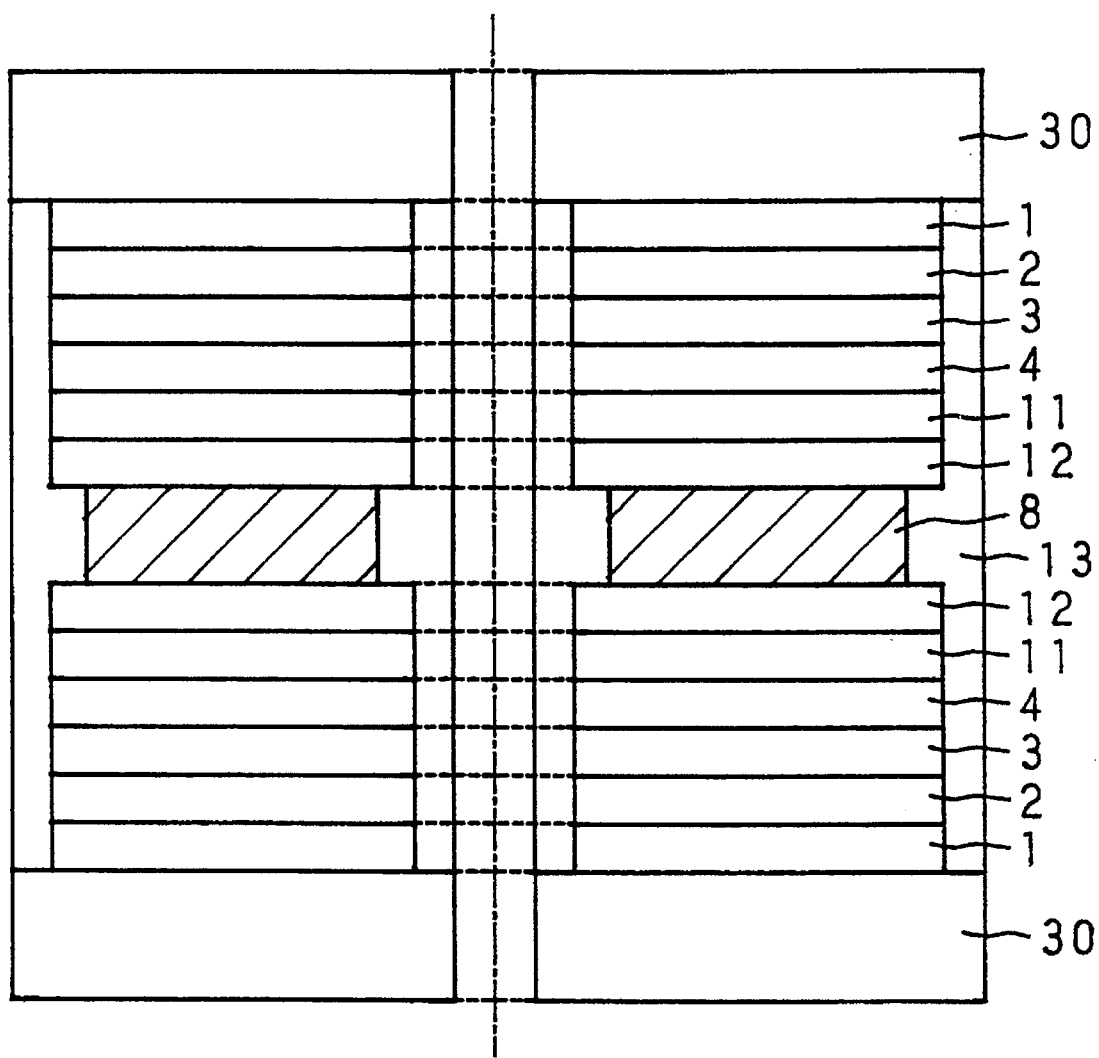
FIG. 17 is a cross sectional view for explaining a process for manufacturing a magneto-optical recording medium according to Embodiment 8 of the invention.

FIG. 17 is a cross sectional view illustrating Embodiment 8 of the invention. In Embodiment 8, the recording layer in each side of the magneto-optical recording medium of Embodiment 7 further comprises a metal thin-film layer 12 formed from a metal, such as Au, Ag, Al, Cu, or Ni, or any of their alloys, and a dielectric layer 11 formed from a material such as $Ta_2O_5$, SiN, AlN, AlSiN, SiAlON, SiO, $SiO_2$, or GeN, the layers 12 and 11 being positioned in this order when viewed from the side of the resin layer 8.

In any of the foregoing embodiments, ultraviolet-curing or epoxy resins are used as materials for the resin layer 8 and second resin layer 8a, but it has been found that the same effect of the invention as previously described can be obtained with other materials such as rubber-like resins, urethane resins, or acrylic resins, if the resin layer is formed in intimate contact with the recording layer.

Also, any of the foregoing embodiments has been described with respect to the structure in which the recording film consists only of magnetic layers or the structure having a dielectric layer 11 and a metal thin-film layer 12 in contacting relationship to the magnetic layers, but it will be appreciated that the same effect of the invention as previously described can be obtained if a protection layer formed, for example, from a dielectric is provided between the substrate and the recording magnetic layer, between the resin layer 8 and the magnetic layer, or between the metal thin-film layer 12 and the resin layer 8.

Furthermore, in the case of a double-sided construction such as the one described in Embodiment 5, the resin layer 8 may also be used as an adhesive layer 13 if a material of good adhesion properties is used for the adhesive layer 8.

Figure 18:
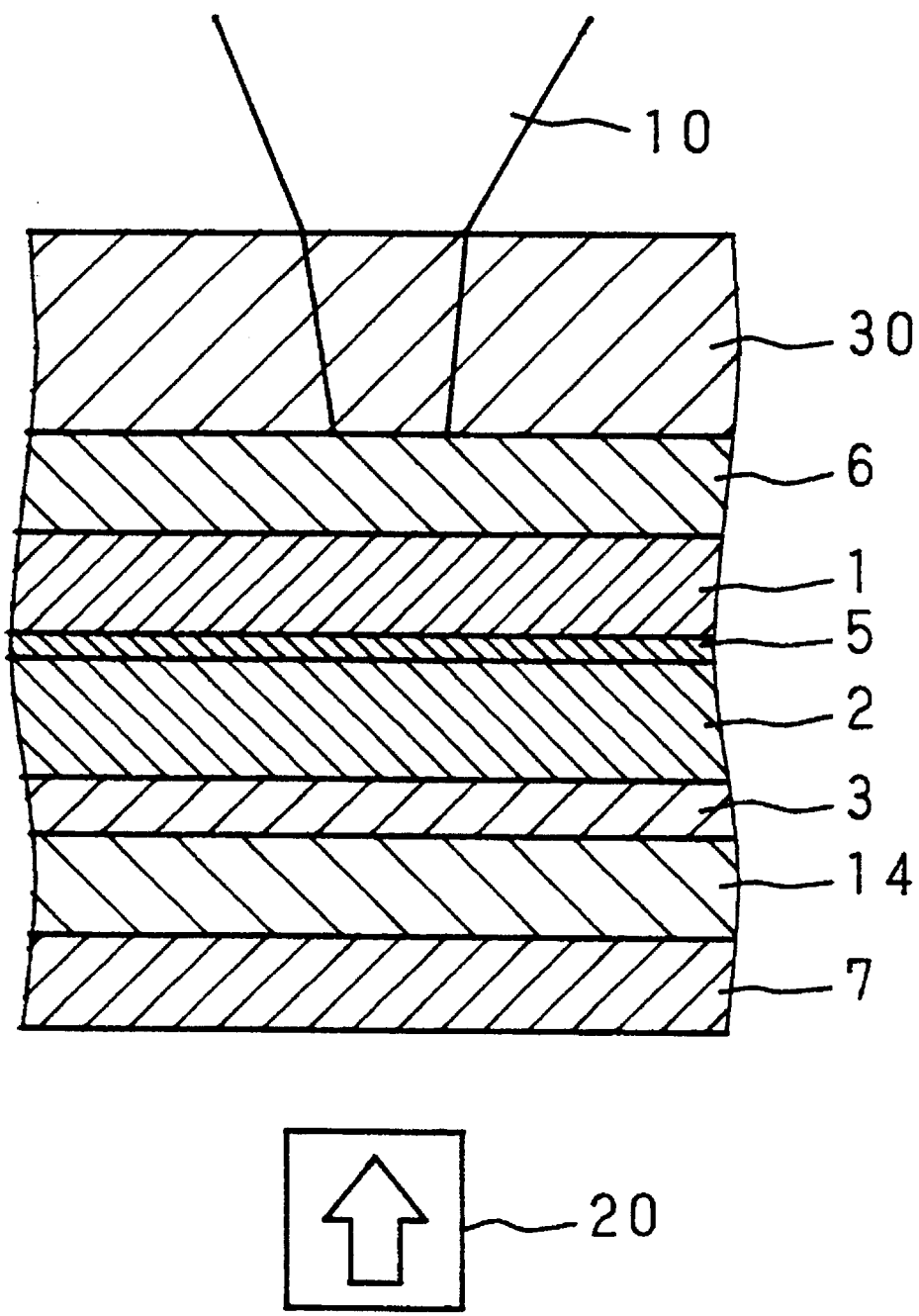
FIG. 18 is a cross sectional view of a portion of a magneto-optical recording medium according to Embodiment 9 of the invention.

FIG. 18 is a cross sectional view of a portion of a magneto-optical recording medium according to a further embodiment of the invention.

The magneto-optical recording medium of this embodiment comprises a multilayered magnetic film for storing information, which consists of multiple magnetic layers formed from basically rare earth metals having perpendicular magnetic anisotropy and Fe and/or Co transition metals, the layers being formed one on top of another over a substrate and coupled together by exchange forceps between adjacent layers. The structure is characterized in that at least one magnetic layer is provided in which reversal of sub-lattice magnetization does not occur during recording or reproduction processes, and in that the magnetic layer consists of basically rare earth metals and Fe and/or Co transition metals whose composition is modulated in a direction perpendicular to the magnetic film surface.

In the magneto-optical recording medium of this embodiment, the initializing layer is different from the one previously described, but otherwise, the substrate and other magnetic layers are the same as those described previously. That is, a dielectric layer, for example, is formed on the same substrate as previously described, and on top of that, the same thin-film magnetic layers of rare earth/transition metal alloys as previously described are formed sequentially, each to an ordinary thickness, with a protection layer being formed in the uppermost layer.

The magnetic layers contacting each other are coupled by exchange forces, as in the previously described structure.

In FIG. 18, the reference numeral 10 is a light beam emitted from a semiconductor laser and focused by a lens; 20 is an external magnetic generator for generating a magnetic field Hb; 30 is a transparent substrate made of glass or plastic material; 1, 2, 3, 14, and 5 are five magnetic layers coupled with one another by exchange forces, 1 designating the first magnetic layer, 2 the second magnetic layer, 3 the third magnetic layer, 14 the magnetic layer (compositionally modulated magnetic layer) whose composition is modulated in a direction perpendicular to its magnetic film surface, and 5 the fifth magnetic layer; and 6 and 7 are dielectric layers.

Specific examples of the layers of the magneto-optical recording medium shown in FIG. 18 will be as shown below. The numbers 25, 65, and 100 in $Tb_{25}Fe_{65}Co_{10}$, for example, designate atomic percentage (at %).

| | |
|---|---|
| Substrate: Transparent glass or plastic substrate | |
| Dielectric layer: SiNx | 600 Å |
| 1st magnetic layer: TbFeCo-based ternary amorphous magnetic alloy layer $Tb_{25}Fe_{65}Co_{10}$ | 700 Å |
| 5th magnetic layer: GdFeCo-based ternary amorphous magnetic alloy layer $Gd_{33}Fe_{60}Co_7$ | 100 Å |
| 2nd magnetic layer: GdDyFeCo-based quaternary amorphous magnetic alloy layer $Gd_{10}Dy_{19}Fe_{47}Co_{24}$ | 800 Å |
| 3rd magnetic layer: TbFeCo-based ternary amorphous magnetic alloy layer $Tb_{17}Fe_{79}Co_4$ | 200 Å |

Compositionally modulated magnetic layer: TbFeCo-based amorphous magnetic layer consisting of Tb and FeCo layers periodically formed one on top of another in direction perpendicular to magnetic film surface and having compositionally modulated structure

| | |
|---|---|
| $Tb_X(Fe_{100-Y}Co_Y)_{100-X}$ | 400 Å |
| Protection layer: SiNx | 600 Å |

The direct overwrite by light power modulation operation for the magneto-optical recording medium of this embodiment is the same as that for the previously described magneto-optical recording medium.

In this embodiment, the initializing layer 14 is different from the previous type in that its composition is modulated in a direction perpendicular to its magnetic film surface. Modulating the composition in a direction perpendicular to the magnetic film surface means that rare earth and transition metal layers, for example, are successively formed along a direction perpendicular to the magnetic film surface, with the atomic percent of the rare earth metal (or transition metal) being modulated in that perpendicular direction. The compositionally modulated structure can be confirmed using, for example, Auger electron spectroscopy.

One specific example of the initializing layer 14 of this embodiment would be a TbCo amorphous magnetic layer having a compositionally modulated structure in which Tb and Co layers, for example, are periodically formed one on top of another in a direction perpendicular to its magnetic film surface. In this case, the composition should preferably be $Tb_XCo_{100-X}$ ($21 \leq X \leq 30$ (at %)). This composition is for the entire layer. It is also desirable that the modulation cycle $\lambda$ be $3 Å \leq \lambda \leq 20 Å$, for then, as compared with the conventional alloy layer having a uniform composition ($\lambda=0$ Å), it provides a broad allowable range for both the light intensity and external magnetic field strength in which sub-lattice magnetization reversal does not occur.

Another specific example of the initializing layer 14 of this embodiment may be a TbFeCo amorphous magnetic layer having a compositionally modulated structure in which Tb and FeCo layers, for example, are periodically formed one on top of another in a direction perpendicular to its magnetic film surface. In this case, the composition should preferably be $Tb_X(Fe_{100-Y}Co_Y)_{100-X}$ ($21 \leq X \leq 30$ (at %), $50 \leq Y \leq 100$ (at %)). This composition is for the entire layer. It is also desirable that the modulation cycle $\lambda$ be 3 Å $\leq \lambda \leq$ 20 Å, for then, as compared with the conventional alloy layer ($\lambda=0$ ÅX) having a uniform composition, it provides a broad allowable range for both the light intensity and external magnetic field strength in which sub-lattice magnetization reversal does not occur.

Since the magneto-optical recording medium of this embodiment has the initializing layer 14 of the above structure, the embodiment permits a wider allowable range for both the light intensity and external magnetic field strength in which reversal of sub-lattice magnetization does not occur in the initializing layer 14, and thus ensures stable direct overwrite by light power modulation operations under wider recording/reproducing conditions. This also serves to broaden the allowable range for the characteristics of other magnetic layers constituting the magneto-optical recording medium, and increase the degree of freedom in terms of the design of the medium.

Referring to FIG. 18, we will now describe a fabrication method for the magneto-optical recording medium of this embodiment.

In the present embodiment, to form the initializing layer 14, rare earth and transition metals are simultaneously deposited on a substrate using sputtering equipment, for example, while the substrate is being rotated.

First, as in the previous method of fabrication, the transparent substrate 30 is mounted on a substrate holder which rotates the substrate past the targets, for example, and the targets are sequentially deposited onto the substrate to form the first magnetic layer 1, the fifth magnetic layer 5, the second magnetic layer 2, and the third magnetic layer 3, in this order.

After that, to form the fourth magnetic layer 14, which is the initializing layer, a Tb target and a Co target are simultaneously sputtered while the substrate is being rotated, for example.

When the film deposition rates of the rare earth and transition metals, with the substrate being rotated, are denoted as a Å/minute and b Å/minute, respectively, a compositionally modulated magnetic film of $\lambda=(a+b)/R$ can be obtained, where $\lambda$ is the modulation cycle and R is the number of revolutions (r.p.m.) of the substrate per minute. For example, when the film deposition rates of Tb and Co from the Tb and Co targets are both 100 Å/minute and the r.p.m. of the substrate is 20, a TbCo compositionally modulated magnetic layer of $\lambda=10$ Å can be obtained. By varying the r.p.m. of the substrate, the modulation cycle $\lambda$ of the compositionally modulated magnetic layer can be varied as desired.

Figure 19:
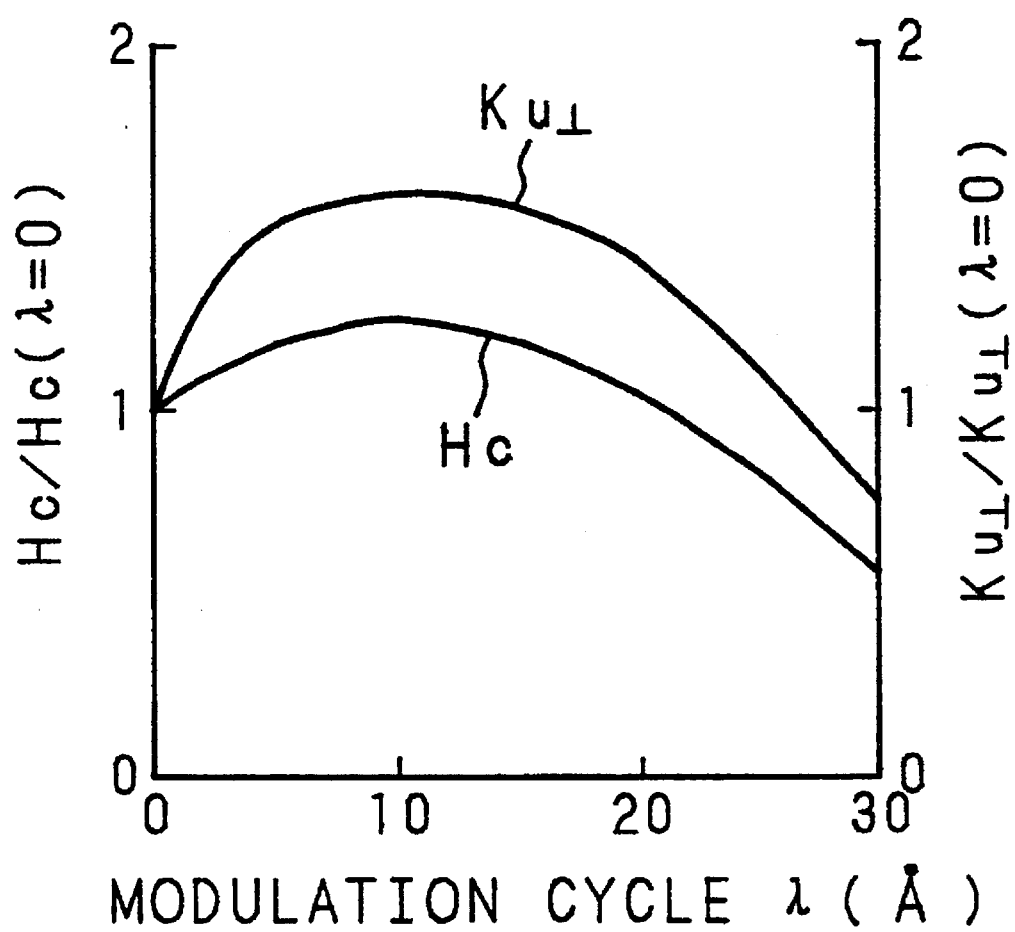
FIG. 19 is a graph showing the relationship of the composition modulation cycle relative to the perpendicular magnetic anisotropy and coercive force for an initializing layer in the magneto-optical recording medium of Embodiment 9.

FIG. 19 shows the perpendicular magnetic anisotropy Ku⊥ and coercive force Hc, at room temperature, of $Tb_{25}Co_{75}$ films with different modulation cycles $\lambda$. As can be seen, a film with large Ku⊥ and Hc can be obtained by composition modulation.

Figure 20:
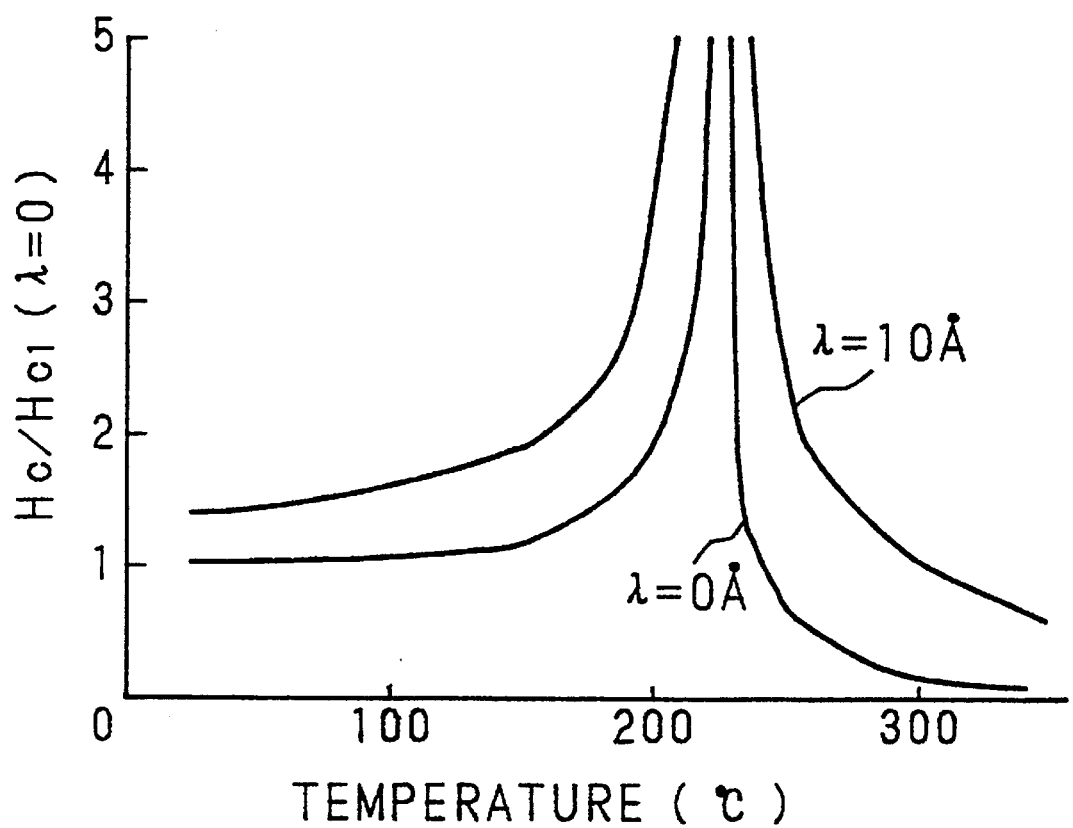
FIG. 20 is a graph showing the relationship between the coercive force and the temperature for the initializing layer in the magneto-optical recording medium of Embodiment 9.

FIG. 20 shows the results of measurements of the temperature dependence of Hc of $Tb_{25}Co_{75}$ films, one with $\lambda=10$ Å at which Hc takes a maximum value and the other with $\lambda=0$ Å, i.e. without composition modulation. As can be seen, the $Tb_{25}Co_{75}$ film with i=10 Å has the greater Hc over the entire temperature measurement range. In the graph, $Hc_1$ ($\lambda=0$) indicates the coercive force at room temperature.

It can therefore be shown that the compositionally modulated magnetic film obtained by the magneto-optical recording medium fabrication method of this embodiment has a greater perpendicular magnetic anisotropy and a greater coercive force over a wider temperature range than those for the conventional magnetic film having a uniform composition. When this compositionally modulated magnetic film is used as the initializing layer, the required reverse magnetic field is large over a wide temperature range, permitting stable direct overwrite by light power modulation operations under wider recording/reproducing conditions.

It will be appreciated that the fabrication method that achieves the above effect is not limited to the above-described method involving the use of sputtering equipment, but the compositionally modulated magnetic film may be formed, for example, by using evaporating equipment and by evaporating materials while opening and closing a shutter.

Embodiment 9

Using sputtering equipment, a dielectric layer 6, a first magnetic layer 1, a fifth magnetic layer 5, a second magnetic layer 2, a third magnetic layer 3, a compositionally modulated magnetic layer 14, etc. were sequentially deposited by sputtering on a glass substrate to fabricate a magneto-optical recording medium of the structure shown in FIG. 18 with the following composition.

| | |
|---|---|
| Dielectric layer: SiNx | 600 Å |
| 1st magnetic layer: TbFeCo-based ternary amorphous magnetic alloy layer  $Tb_{25}Fe_{65}Co_{10}$ | 700 Å |
| 5th magnetic layer: GdFeCo-based ternary amorphous magnetic alloy layer  $Gd_{33}Fe_{60}Co_7$ | 100 Å |
| 2nd magnetic layer: GdDyFeCo-based quaternary amorphous magnetic alloy layer  $Gd_{10}Dy_{19}Fe_{47}Co_{24}$ | 800 Å |
| 3rd magnetic layer: TbFeCo-based ternary amorphous magnetic alloy layer  $Tb_{17}Fe_{79}Co_4$ | 200 Å |

Composition modulated magnetic layer: TbCo-based binary amorphous magnetic layer

| | |
|---|---|
| $Tb_{25}Co_{75}$ (Modulation cycle $\lambda = 10$ Å) | 400 Å |
| Protection layer: SiNx | 600 Å |

In this example, the compositionally modulated magnetic layer 14 consists of a $Tb_{25}Co_{75}$ film of $\theta=10$ Å deposited by sputtering off a Tb target and a Co target. The conditions for the deposition were 2.3 m Torr of argon pressure during film deposition, 300 W of power for both the Tb and Co targets, and 200 r.p.m. of substrate rotating speed.

On the thus fabricated magneto-optical recording medium, a signal of pit length 3.8 μm was recorded which was then overwritten with a signal of pit length 2.9 μm using a direct overwrite by light power modulation technique with the conditions of linear velocity at 7.5 m/second, applied magnetic field at 300 Oe, and $P_{LOW}$ at 3.0 mW, with $P_{HIGH}$ being varied over a given range, and the thus overwritten signal was reproduced. $P_{READ}$ was set at 1.0 mW.

Figure 21:
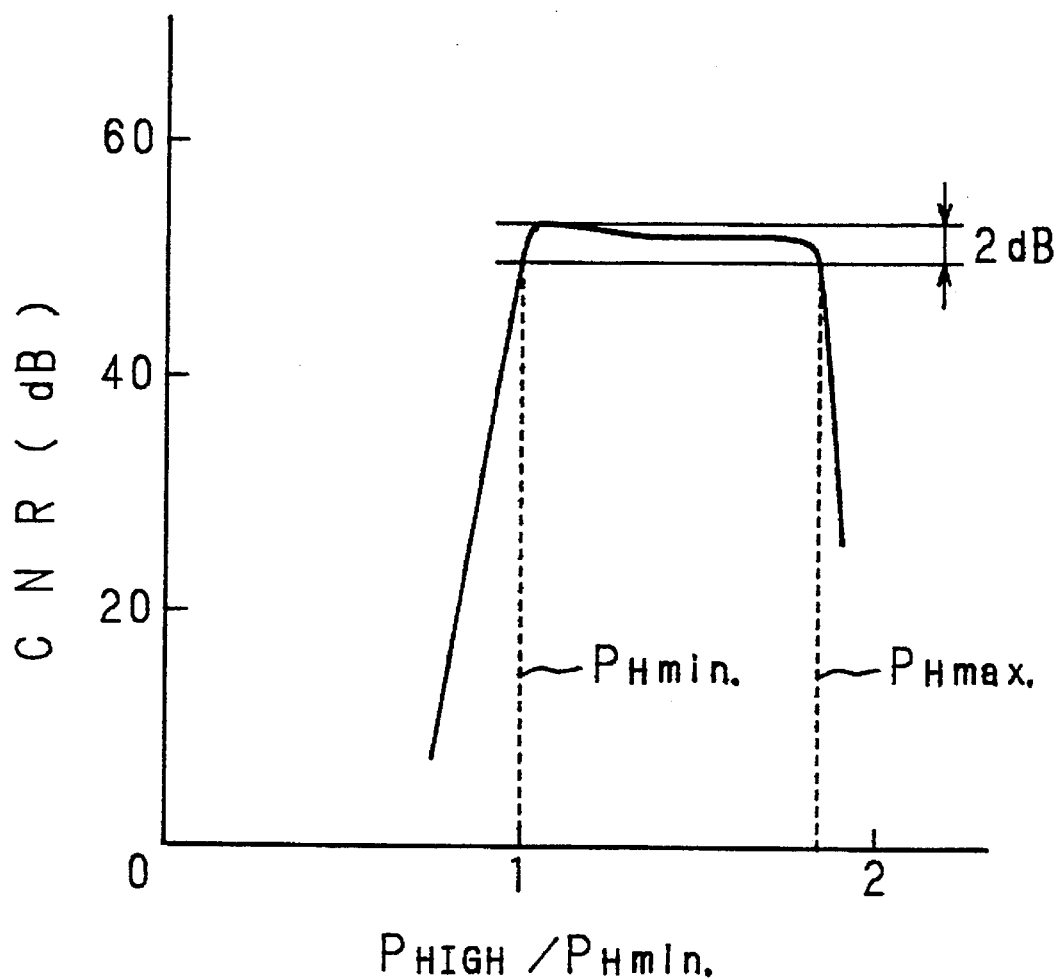
FIG. 21 is a graph showing the relationship between the C/N ratio and ($P_{HIGH}/P_{Hmin.}$) in Embodiment 9.

FIG. 21 shows the results of measurement. As shown in FIG. 21, if the points on the curve at which the CNR (carrier-to-noise ratio) is 2 dB lower than the maximum are taken as the lower limit ($P_{Hmin.}$) and upper limit ($P_{Hmax.}$), respectively, to define the allowable range for $P_{HIGH}$, the allowable range for $P_{HIGH}$ (($P_{Hmax.}-P_{Hmin.}$)/{$P_{Hmax.}+P_{Hmin.}$}/2}) obtained was 70% in this example.

Comparative Example 1

A first magnetic layer 1, a fifth magnetic layer 5, a second magnetic layer 2, a third magnetic layer 3, and a fourth magnetic layer (initializing layer) were sequentially deposited by sputtering on a glass substrate to fabricate a magneto-optical recording medium. The structure is the same as that of Embodiment 9, except that the compositionally modulated magnetic layer 14 (initializing layer) is replaced by the fourth magnetic layer. In this example, the fourth magnetic layer consists of a $Tb_{25}Co_{75}$ film with modulation cycle $\lambda=0$ Å, the film being deposited off a TbCo alloy target using a conventional method.

On the thus manufactured magneto-optical recording medium, a signal of pit length 3.8 μm was recorded which was then overwritten with a signal of pit length 2.9 μm using a direct overwrite by light power modulation technique, as in Embodiment 9, with the conditions of linear velocity at 7.5 m/second, applied magnetic field at 300 Oe, and $P_{LOW}$ at 3.0 mW, with $P_{HIGH}$ being varied over a given range, and the thus overwritten signal was reproduced. $P_{READ}$ was set at 1.0 mW.

The allowable range for $P_{HIGH}$ obtained was 50% in this example.

Embodiments 10–14

A first magnetic layer 1, a fifth magnetic layer 5, a second magnetic layer 2, a third magnetic layer 3, and a compositionally modulated magnetic layer 14 were sequentially deposited by sputtering on a glass substrate to fabricate a magneto-optical recording medium. The structure is the same as that of Embodiment 9, with only difference being in the initializing layer (compositionally modulated magnetic layer 14). In these examples, the compositionally modulated magnetic layer 14 consists of a $Tb_{25}Co_{75}$ film deposited off a Tb target and a Co target and having a different modulation cycle, i.e. $\lambda=3$ Å, $\lambda=5$ Å, $\lambda=15$ Å, $\lambda=20$ Å, and $\lambda=30$ Å for Embodiments 10, 11, 12, 13, and 14, respectively.

On each magneto-optical recording medium thus fabricated, a signal of pit length 3.8 μm was recorded which was then overwritten with a signal of pit length 2.9 μm using a direct overwrite by light power modulation technique, as in Embodiment 9, with the conditions of linear velocity at 7.5 m/second, applied magnetic field at 300 Oe, and $P_{LOW}$ at 3.0 mW, with $P_{HIGH}$ being varied over a given range, and the thus overwritten signal was reproduced. $P_{READ}$ was set at 1.0 mW.

Figure 22:
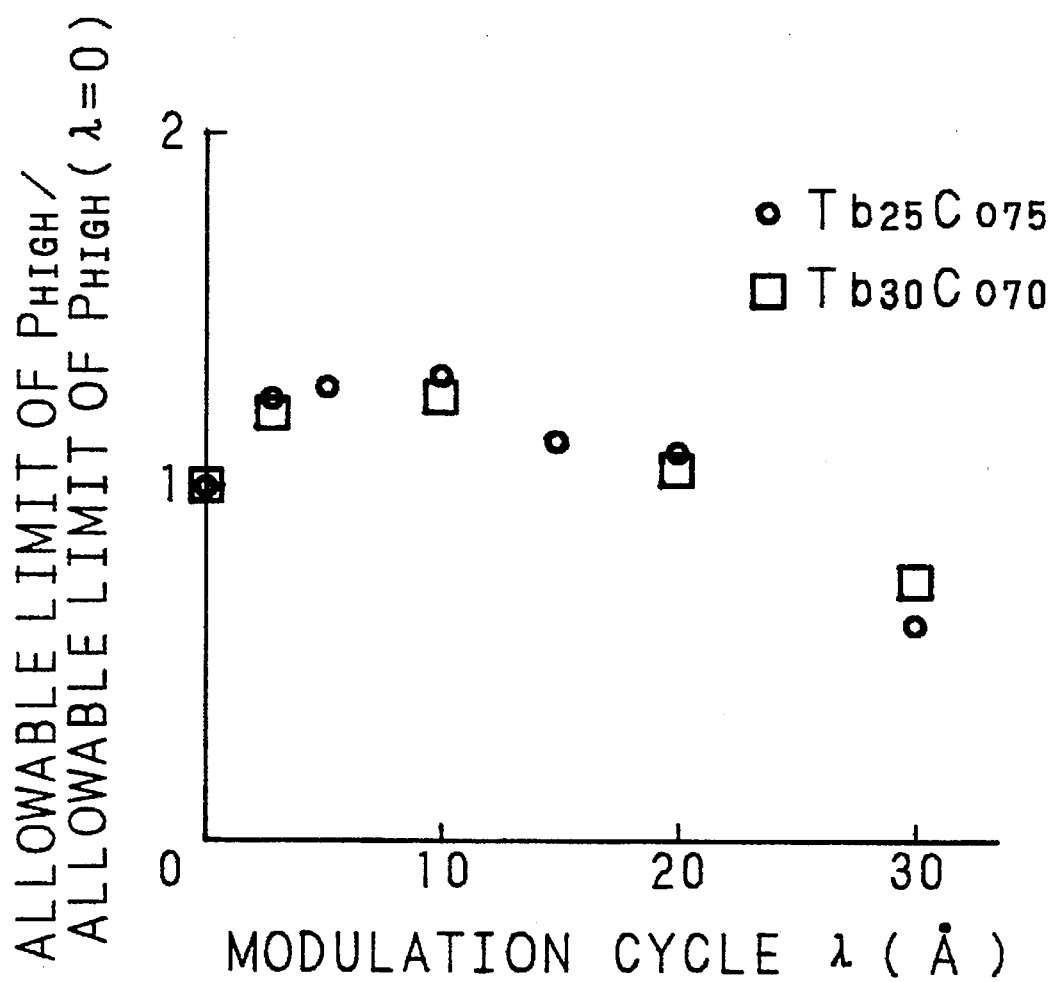
FIG. 22 is a graph showing the relationship between the allowable range for $P_{HIGH}$ and the composition modulation cycle for the magneto-optical recording medium for comparison among Embodiments 8–18 and Comparative Examples 1 and 2.

The allowable range for $P_{HIGH}$ was measured for each recording medium. FIG. 22 shows the obtained results (marked o) plotted against the modulation cycle λ, along with the results of Embodiment 9 and Comparative Example 1. As can be seen from the graph, the allowable range for $P_{HIGH}$ obtained is large over the range 3 Å$\leq\lambda\leq$20 Å, which is contrasted with the conventional magneto-optical recording medium having an initializing layer formed by sputtering using an alloy target.

Embodiments 15–18 and Comparative Example 2

A first magnetic layer 1, a fifth magnetic layer 5, a second magnetic layer 2, a third magnetic layer 3, and an initializing layer were sequentially deposited by sputtering on a glass substrate to fabricate a magneto-optical recording medium. The structure is the same as that of Embodiment 9, with only difference being in the initializing layer. In Embodiments 15–18, the initializing layer consists of a $Tb_{30}Co_{70}$ film (compositionally modulated magnetic film 14) deposited off a Tb target and a Co target and having a different modulation cycle, i.e. $\lambda=3$ Å, $\lambda=10$ Å, $\lambda=20$ Å, and $\lambda=30$ Å for Embodiments 15, 16, 17, and 18, respectively. In Comparative Example 2, the initializing layer consists of a $Tb_{30}Co_{70}$ film (fourth magnetic layer) of $\lambda=0$ Å, the film being formed by a conventional method using a TbCo alloy target.

On each magneto-optical recording medium thus fabricated, a signal of pit length 3.8 μm was recorded which was then overwritten with a signal of pit length 2.9 μm using a direct overwrite by light power modulation technique, as in Embodiment 9, with the conditions of linear velocity at 7.5 m/second, applied magnetic field at 300 Oe, and $P_{LOW}$ 3.0 mW, with $P_{HIGH}$ being varied over a given range, and the thus overwritten signal was reproduced. $P_{READ}$ was set at 1.0 mW.

The allowable range for $P_{HIGH}$ was measured for each recording medium. FIG. 22 shows the obtained results (marked □) plotted against the modulation cycle A. As can be seen from the graph, the allowable range for $P_{HIGH}$ obtained is large over the range 3 Å$\leq\lambda\leq$20 Å, which is contrasted with the conventional magneto-optical recording medium having an initializing layer formed by sputtering using an alloy target.

Embodiments 19–22 and Comparative Example 3

A first magnetic layer 1, a fifth magnetic layer 5, a second magnetic layer 2, a third magnetic layer 3, and an initializing layer were sequentially deposited by sputtering on a glass substrate to fabricate a magneto-optical recording medium. The structure is the same as that of Embodiment 9, with only difference being in the initializing layer. In Embodiments 19–22, the initializing layer consists of a $Tb_{25}(Fe_{30}Co_{70})_{75}$ film (compositionally modulated magnetic film 14) deposited off a Tb target and an FeCo target and having a different modulation cycle, i.e. $\lambda=3$ Å, $\lambda=10$ Å, $\lambda=20$ Å, and $\lambda=30$ Å for Embodiments 19, 20, 21, and 22, respectively. In Comparative Example 3, the initializing layer consists of a $Tb_{25}(Fe_{30}Co_{70})_{75}$ film (fourth magnetic layer) of $\lambda=0$ Å, the film being formed by a conventional method using a TbFeCo alloy target.

On each magneto-optical recording medium thus fabricated, a signal of pit length 3.8 μm was recorded which was then overwritten with a signal of pit length 2.9 μm using a direct overwrite by light power modulation technique, as in Embodiment 9, with the conditions of linear velocity at 7.5 m/second, applied magnetic field at 300 Oe, and $P_{LOW}$ 3.0 mW, with $P_{HIGH}$ being varied over a given range, and the thus overwritten signal was reproduced. $P_{READ}$ was set at 1.0 mW.

Figure 23:
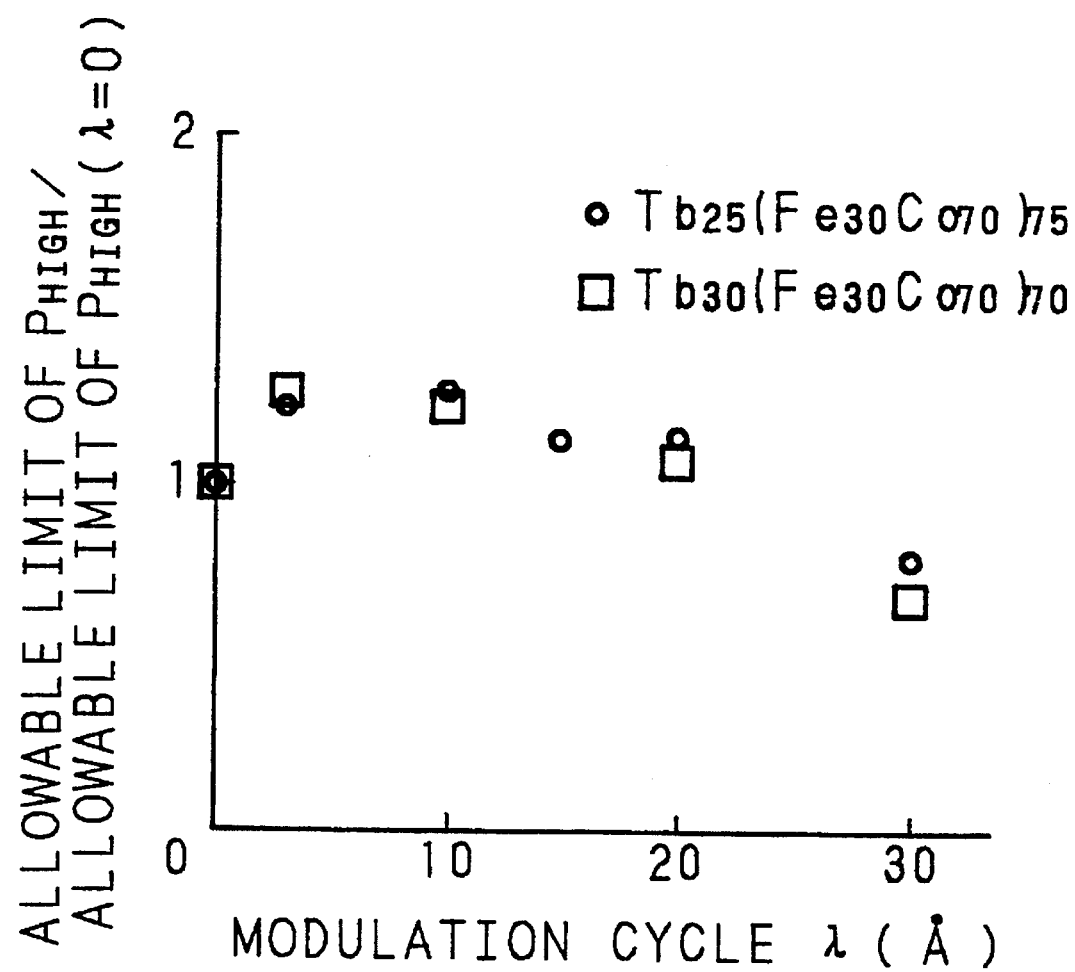
FIG. 23 is a graph showing the relationship between the allowable range for $P_{HIGH}$ and the composition modulation cycle for the magneto-optical recording medium for comparison among Embodiments 19–26 and Comparative Examples 3 and 4.

The allowable range for $P_{HIGH}$ was measured for each recording medium. FIG. 23 shows the obtained results (marked o) plotted against the modulation cycle λ. As can be seen from the graph, the allowable range for $P_{HIGH}$ obtained is large over the range 3 Å$\leq\lambda\leq$20 Å, which is contrasted with the conventional magneto-optical recording medium having an initializing layer formed by sputtering using an alloy target.

Embodiments 23–26 and Comparative Example 4

A first magnetic layer 1, a fifth magnetic layer 5, a second magnetic layer 2, a third magnetic layer 3, and an initializing layer were sequentially deposited by sputtering on a glass substrate to fabricate a magneto-optical recording medium. The structure is the same as that of Embodiment 9, with only difference being in the initializing layer. In Embodiments 23–26, the initializing layer consists of a $Tb_{30}(Fe_{30}Co_{70})_{70}$ film (compositionally modulated magnetic film 14) deposited off a Tb target and an FeCo target and having a different modulation cycle, i.e. $\lambda=3$ Å, $\lambda=10$ Å, $\lambda=20$ Å, and $\lambda=30$ Å for Embodiments 23, 24, 28, and 26, respectively. In Comparative Example 4, the initializing layer consists of a $Tb_{30}(Fe_{30}Co_{70})_{70}$ film (fourth magnetic layer) of $\lambda=0$ Å, the film being formed by a conventional method using a TbFeCo alloy target.

On each magneto-optical recording medium thus fabricated, a signal of pit length 8.8 μm was recorded which was then overwritten with a signal of pit length 2.9 μm using a direct overwrite by light power modulation technique, as in Embodiment 9, with the conditions of linear velocity at 7.5 m/second, applied magnetic field at 300 Oe, and $P_{LOW}$ 3.0 mW, with $P_{HIGH}$ being varied over a given range, and the thus overwritten signal was reproduced. $P_{READ}$ was set at 1.0 mW.

The allowable range for $P_{HIGH}$ was measured for each recording medium. FIG. 23 shows the obtained results (marked □) plotted against the modulation cycle $\lambda$. As can be seen from the graph, the allowable range for $P_{HIGH}$ obtained is large over the range 3 Å$\leq \lambda$20 Å, which is contrasted with the conventional magneto-optical recording medium having an initializing layer formed by sputtering using an alloy target.

Figure 24:
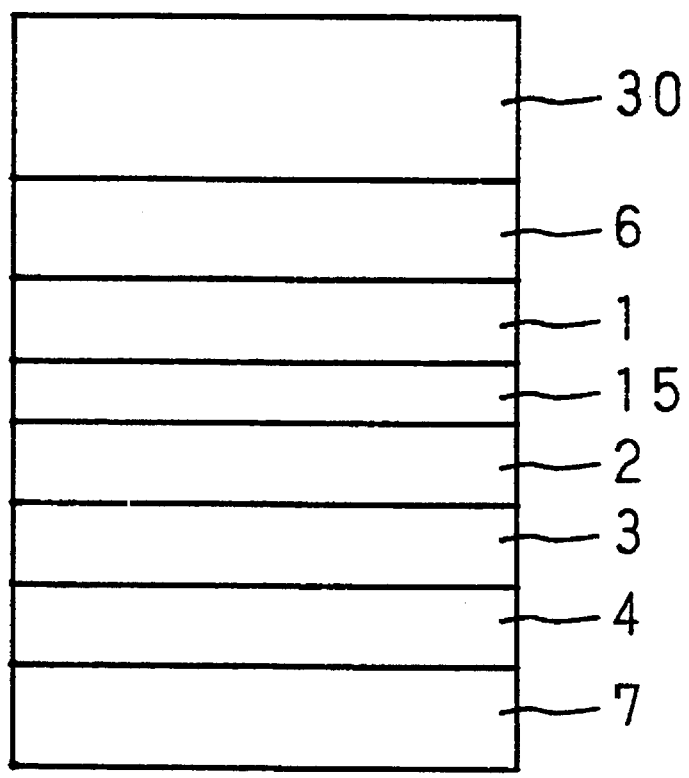
FIG. 24 is a cross sectional view of a portion of a magneto-optical recording medium according to Embodiments 27, 28, 31, 32, 33, and 34 of the invention.

A still further embodiment of the invention will be described below. The basic structure of the magneto-optical recording medium of this embodiment is shown in FIG. 24. As shown, a dielectric layer 6 of SiN, TaO, ZnS, etc. is formed on a transparent substrate made of glass or plastic material, and on top of that, a layered structure is formed which consists of a first magnetic layer 1, an intermediate layer 15, a second magnetic layer 2, a third magnetic layer 3, a fourth magnetic layer 4, and a dielectric layer 7 of the same material as the dielectric layer 6.

The direction of magnetization of the first magnetic layer 1 is determined during a cooling process by the exchange forces associated with the direction of magnetization of the second magnetic layer 2. The first magnetic layer 1 has the second lowest Curie temperature after the third magnetic layer 3, and is formed, for example, from an alloy of rare earth and transition metals, such as $Tb_y(Fe_xCo_{100-x})_{100-y}$ ($90 \leq x \leq 100$, $20 \leq y \leq 27$).

The intermediate layer 15 is a layer for adjusting the exchange forces between the first magnetic layer 1 and the second magnetic layer 2, and is formed, for example, from $Gd_y(Fe_xCo_{100-x})_{100-y}$ that exhibits hardly any perpendicular magnetic anisotropy. The provision of the intermediate layer becomes necessary depending on the magnitude of the exchange forces, and is not a condition.

The second magnetic layer 2 is a magnetic layer whose direction of magnetization is determined by an external magnetic field during the high power process. The second magnetic layer 2 is required to have the highest Curie temperature after the fourth magnetic layer 4, and is formed, for example, from an alloy of rare earth and transition metals, such as $Dy_z(Fe_xCo_{100-x})_{100-z}$, $(Gd_yDy_{100-y})_z(Fe_xCo_{100-x})_{100-z}$, or $(Gd_yTb_{100-y})_z(Fe_xCo_{100-x})_{100-z}$.

The third magnetic layer 3 is a layer for shutting off the exchange forces between the second and fourth magnetic layers 2 and 4 at high temperatures. The third magnetic layer 3 is selected to have the lowest Curie temperature of all the magnetic layers, and formed, for example, from $Tb_xFe_{100-x}$ ($18 \leq x \leq 27$).

Further, the fourth magnetic layer 4 is formed from a material having a Curie temperature of 300° C. or over so that the direction of its magnetization does not change even during the high power process. Such material includes, for example, $Tb_xCo_{100-x}$ ($19 \leq x \leq 28$).

The overwriting method for the magneto-optical recording medium having the above magnetic layers is the same as that for the previously described magneto-optical recording medium. In the present embodiment, in order to reduce the overall thickness of the layered magnetic film structure, the relationships among the compositions, thicknesses, and characteristics of the first and second magnetic layers were examined to determine optimum compositions. The features of the present embodiment will be described in detail below by way of specific examples.

Embodiment 27

In this embodiment, the four magnetic layers were deposited on the transparent substrate 30 by sputtering in the order listed below.

| | | |
|---|---|---|
| Dielectric layer 6: | SiN | 600 Å |
| 1st magnetic layer 1: | $Tb_{25}(Fe_{95}Co_5)_{75}$ | 300 Å |
| Intermediate layer 15: | $Gd_{30}(Fe_{70}Co_{30})_{70}$ | 50 Å |
| 2nd magnetic layer 2: | $Dy_x(Fe_{60}Co_{40})_{100-x}$ | |
| | 300 Å, 500 Å, 700 Å | ($25 \leq x \leq 28$) |
| 3rd magnetic layer 3: | $Tb_{20}Fe_{80}$ | 150 Å |
| 4th magnetic layer 4: | $Tb_{26}Co_{74}$ | 300 Å |
| Dielectric layer 7: | SiN | 600 Å |

The thickness and the Dy content were varied for the second magnetic layer 2 only, as shown above, and their effects on the recording/reproducing characteristics were examined. To examine the recording/reproducing characteristics, a 1.3 MHz signal was recorded which was then overwritten with a 1 MHz signal, and the C/N ratio of the reproduced signal at 1 MHz was measured. The recording was performed with the linear velocity set at 5.7 m/s and Hb=300 (Oe), and $P_{HIGH}$ and $P_{LOW}$ were chosen to give the greatest C/N ratio. $P_{READ}$ was set at 1 mW. FIGS. 25(a), (b), and (c) show the C/N ratio plotted as a function of the Dy content for the various thicknesses of the second magnetic layer 2, i.e. 300 Å, 500 Å, and 700 Å, respectively. As shown in FIGS. 25(b) and (c), for the layer thicknesses of 500 Å and 700 Å, a good C/N ratio was obtained over the range of Dy content 25 to 28 atomic percent (hereinafter simply %). By contrast, when the thickness of the second magnetic layer 2 was reduced to 300 Å, as shown in FIG. 25(a), there was observed an abrupt drop in the C/N ratio at x>27%. The reason will be described below qualitatively.

Figure 26:
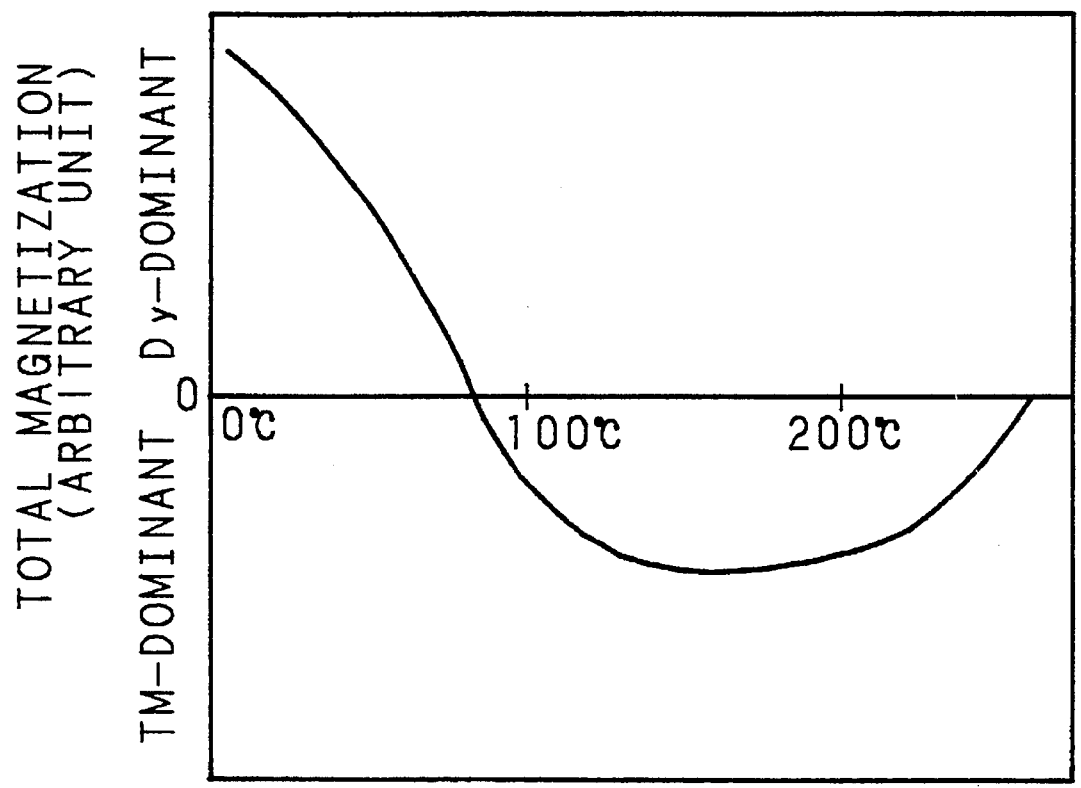
FIG. 26 is a graph showing the temperature dependence characteristic of layer magnetization of the magneto-optical recording medium of Embodiment 27.

All the four magnetic layers used in this example are formed from alloys of transition metals (Fe, Co) and rare earth metals (Gd, Dy, Tb). The atomic magnetic spins of the transition and the rare earth metals are coupled ferrimagnetically, i.e., aligned in an antiparallel arrangement. For example, in the second magnetic layer 2, the sub-lattice magnetization of Dy and the sub-lattice magnetization of transition metals FeCo are coupled in antiparallel fashion. In the range of Dy content 25 to 28%, the sub-lattice magnetization of Dy is greater than the sub-lattice magnetization of the transition metals. This state is called "Dy-dominant". However, as the temperature is raised, the sub-lattice magnetization of the rare earth metal reduces at a greater rate than the sub-lattice magnetization of the transition metals; therefore, as the temperature rises, the state gradually changes from Dy-dominant to TM-dominant (transition metal-dominant) in which the sub-lattice magnetization of the transition metals is greater than that of the rare earth metal. This change is illustrated in FIG. 26, when x=25%, for example. The total magnetization plotted along the ordinate represents the difference between the sub-lattice magnetization of the rare earth metal and that of the transition metals. As shown in FIG. 26, the total magnetization becomes zero at a certain temperature. This temperature is called the compensation temperature. The composition achieving the compensation temperature is called the compensation composition. At the compensation temperature, the total magnetization changes sign. The compensation temperature varies depending on the composition. If, at room temperature, the state is RE-dominant (rare earth-dominant) in which the sub-lattice magnetization of the rare earth metal is the greater, the compensation point is at a higher temperature. Therefore, the compensation temperature is higher for x=26% at which the rare earth metal content is higher than at x=25%.

Figure 27:
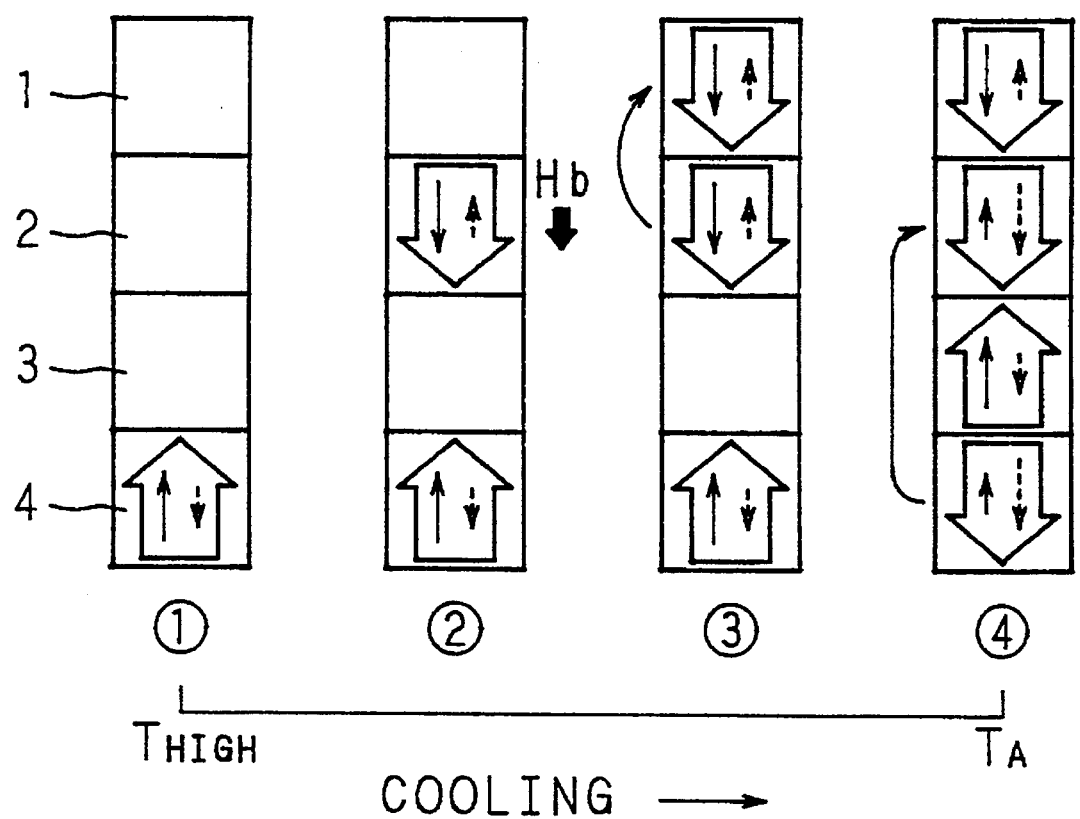
FIG. 27 is a diagram for explaining how the transfer of magnetization occurs in high power process mode in the magneto-optical recording medium of Embodiment 27.

With the above concept as the basis, we will explain how the direction of magnetization changes during high power process. First, the transition metal sub-lattices in the fourth magnetic layer 4 are oriented upward. FIG. 27 shows subsequent changes in the magnetization of each layer after the magnetic layer reaches $T_{HIGH}$. In FIG. 27, the direction of total magnetization is shown by a hollow arrow, the direction of transition metal sub-lattice magnetization by a solid arrow, and the direction of rare earth sub-lattice magnetization by a dotted arrow. In FIG. 27, the point of consideration is the transition from state 2 to state 3 during the cooling process. The temperature in state 3, for example, is thought to be 100° to 150° C. When x is smaller, the compensation temperature is lower than the temperature in state 3, so that in state 3 the second magnetic layer 2 is TM-dominant, as shown in FIG. 27. However, when x is larger, for example, when x is 28%, the compensation temperature is higher than 200° C., and the second magnetic layer 2 is already RE-dominant at a higher temperature than the temperature in state 3. At this time, the direction of total magnetization is oriented upward as shown in state 3 in FIG. 28, opposite to the direction shown in state 3 of FIG. 27. In this case, a necessary and sufficient condition for achieving state 3 of FIG. 27 is equivalent to achieving the transition shown in FIG. 28. When this condition is considered from the viewpoint of static energy balance, the following inequality must be satisfied.

$$2M_{s1}t_1(H_{c1}-H_b)-\sigma_{w12}<2M_{s2}t_2(H_{c2}-H_b)-\sigma_{w12} \quad (1)$$

where $M_{si}$, $t_i$, and $H_{ci}$ (i=1, 2) are the total magnetization, thickness, and coercive force, respectively, of the ith magnetic layer. For the above inequality to hold, $M_{s2}$ should be made small and $t_2$ should be made large, since it is known that in this type of ferrimagnetic material the product of $M_{s2}$ and $H_{c2}$ is essentially constant and is virtually independent of the composition x. That is, for the second magnetic layer 2, the composition x should be made small and the thickness should be made large. In FIG. 25, the area where the C/N ratio is degraded corresponds to the area where x is large and the layer thickness is thin, and hence, it is apparent that such area is unfavorable in satisfying the above expression (1). Therefore, in the case of x larger than 27% and the layer thickness of 300 Å, it is presumed that state 3 could not be achieved completely, which resulted in an increase in noise and hence degradation of the C/N ratio. It can therefore be shown that if x is made smaller than 27%, no problem would be caused if the layer thickness was reduced to 300 Å.

Embodiment 28

In Embodiment 27, DyFeCo was used for the second magnetic layer 2, but in Embodiment 28, GdDyFeCo was used.

In this embodiment, the four magnetic layers were deposited on the transparent substrate 30 by sputtering in the order listed below.

| Dielectric layer 6: | SiN | 600 Å | |
|---|---|---|---|
| 1st magnetic layer 1: | $Tb_{25}(Fe_{93}Co_7)_{75}$ | 300 Å | |
| Intermediate layer 15: | $Gd_{30}(Fe_{70}Co_{30})_{70}$ | 50 Å | |
| 2nd magnetic layer 2: | $(Gd_{40}Dy_{60})_x(Fe_{75}Co_{25})_{100-x}$ 300 Å, 500 Å, 700 Å | | (25 ≦ x ≦ 28) |
| 3rd magnetic layer 3: | $Tb_{20}(Fe_{98}Co_2)_{80}$ | 150 Å | |
| 4th magnetic layer 4: | $Tb_{26}Co_{74}$ | 300 Å | |
| Dielectric layer 7: | SiN | 600 Å | |

The thickness and the rare earth metal content of the second magnetic layer 2 were varied, and their effects on the recording/reproducing characteristics were examined in the same manner as described in Embodiment 27. The results are shown in FIG. 29, the graph (a) for thickness 300 Å, (b) for thickness 500 Å, and (c) for thickness 700 Å. In each graph, the rare earth metal content x is plotted along the abscissa, and the C/N ratio along the ordinate. As can be seen from FIG. 29, the C/N ratio degraded when the layer thickness was thin and x was larger than 27%, but when x was 27% or smaller, a good C/N ratio was obtained even if the thickness was reduced to 300 Å.

Embodiment 29

In this embodiment, the four magnetic layers were deposited on the transparent substrate 30 by sputtering in the order listed below.

| Dielectric layer 6: | SiN | 600 Å | |
|---|---|---|---|
| 1st magnetic layer 1: | $Tb_{25}(Fe_{95}Co_5)_{75}$ | 300 Å | |
| Intermediate layer 15: | $Gd_{30}(Fe_{70}Co_{30})_{70}$ | 50 Å | |
| 2nd magnetic layer 2: | $(Gd_{50}Dy_{50})_x(Fe_{85}Co_{15})_{100-x}$ 300 Å, 500 Å, 700 Å | | (25 ≦ x ≦ 28) |
| 3rd magnetic layer 3: | $Tb_{20}(Fe_{99}Co_1)_{80}$ | 150 Å | |
| Fourth magnetic layer 4: | $Tb_{26}Co_{74}$ | 300 Å | |
| Dielectric layer 7: | SiN | 600 Å | |

Figure 30A:
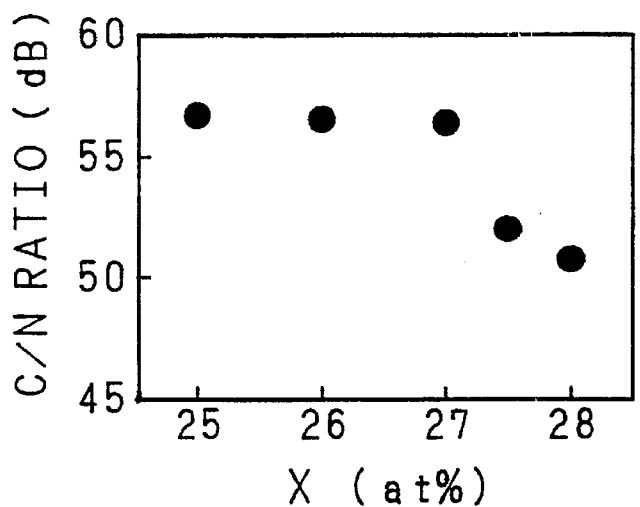
FIG. 30(a) is a graph showing the relationship between the C/N ratio and the rare earth metal content when the thickness of the second magnetic Layer in the magneto-optical optical recording medium of Embodiment 29 is 300Å.
Figure 30B:
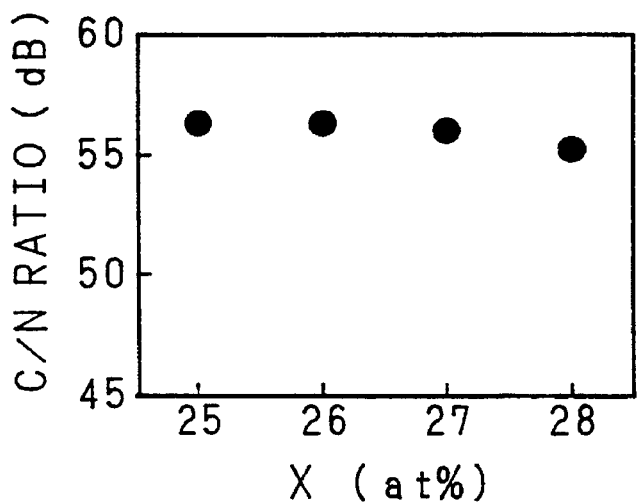
FIG. 30(b) is a graph showing the relationship between the C/N ratio and the rare earth metal content when the thickness of the second magnetic layer in the magneto-optical recording medium of Embodiment 29 is 500Å.
Figure 30C:
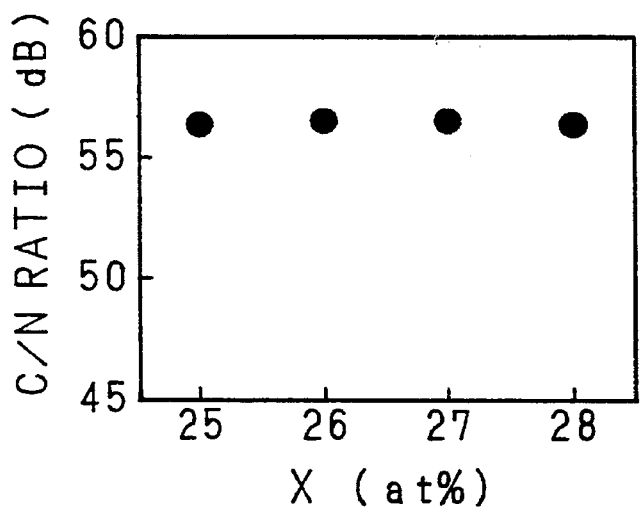
FIG. 30(c) is a graph showing the relationship between the C/N ratio and the rare earth metal content when the thickness of the second magnetic layer in the magneto-optical recording medium of Embodiment 29 is 700Å.

The thickness and the rare earth metal content of the second magnetic layer 2 were varied, and their effects on the recording/reproducing characteristics were examined in the same manner as described in Embodiments 27 and 28. The results are shown in FIG. 30, the graph (a) for thickness 300 Å, (b) for thickness 500 Å, and (c) for thickness 700 Å, as in FIG. 29. In each graph, the rare earth metal content x is plotted along the abscissa, and the C/N ratio along the ordinate. As can be seen from FIG. 30, in this embodiment also, the C/N ratio degraded when the layer thickness was thin and x was larger than 27%, but when x was 27% or smaller, a good C/N ratio was obtained even if the thickness was reduced to 300 Å.

In the above three embodiments, the thickness of the second magnetic layer 2 was reduced to enhance the recording sensitivity of the magneto-optical recording medium, and optimum conditions for the composition with reduced thickness were obtained.

In the following embodiment, study was conducted on reducing the thickness of the first magnetic layer 1 to enhance the recording sensitivity of the resulting magneto-optical recording medium.

Embodiment 30

The layers were deposited on the transparent substrate by sputtering in the order listed below.

| Dielectric layer 6: | SiN | 600 Å |
|---|---|---|
| 1st magnetic layer 1: | $Tb_x(Fe_{95}Co_5)_{100-x}$ (x = 23% or 25%) | 200 Å, 300 Å |
| Intermediate layer 15: | $Gd_{30}(Fe_{70}Co_{30})_{70}$ | None, 25 Å, 50 Å, 75 Å, 100 Å |
| 2nd magnetic layer 2: | $Dy_{26}(Fe_{60}Co_{40})_{74}$ | 300 Å |
| 3rd magnetic layer 3: | $Tb_{20}Fe_{80}$ | 150 Å |
| 4th magnetic layer 4: | $Tb_{26}Co_{74}$ | 300 Å |
| Dielectric layer 7: | SiN | 600 Å |

The intermediate layer 15 is provided to adjust the interface wall energy σW that determines the exchange forces (hereinafter denoted as σW). The exchange force σW decreases with increasing thickness of the intermediate layer 15.

Figure 31A:
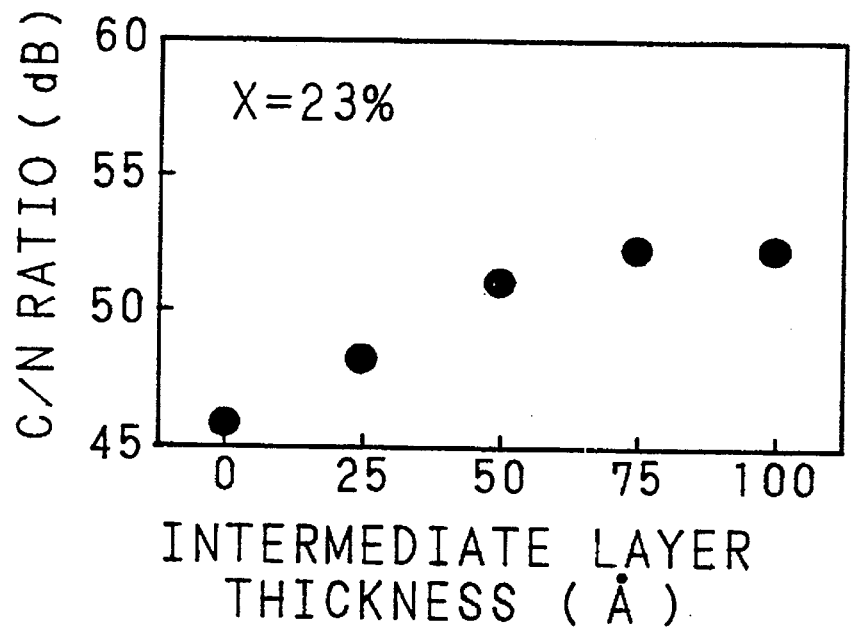
FIG. 31(a) is a graph showing the relationship between the C/N ratio and the intermediate layer thickness when the thickness of the first magnetic layer in the magneto-optical recording medium of Embodiment 30 is 200Å and the rare earth metal content thereof is 23%.
Figure 31B:
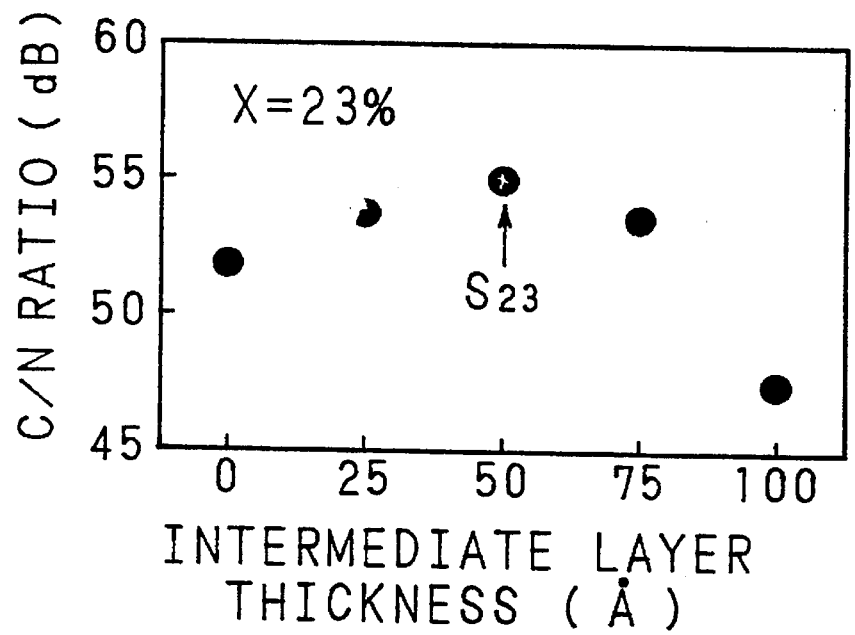
FIG. 31(b) is a graph showing the relationship between the C/N ratio and the intermediate layer thickness when the thickness of the first magnetic layer in the magneto-optical recording medium of Embodiment 30 is 300 Å and the rare earth metal content thereof is 23%.

The thickness and the Tb content of the first magnetic layer 1 and the thickness of the intermediate layer 15 were varied, as shown above, and their effects on the recording/reproducing characteristics were examined. As in Embodiments 27–29, a 1.3 MHz signal was recorded which was then overwritten with a 1 MHz signal, and the C/N ratio of the reproduced signal at 1 MHz was measured to examine the recording/reproducing characteristics. The recording was performed with the linear velocity set at 5.7 m/s and Hb=300 (Oe), and $P_{HIGH}$ and $P_{LOW}$ were chosen to give the greatest C/N ratio. $P_{READ}$ was set at 1 mW. The results are shown in FIG. 31 for Tb content 23% and in FIG. 32 for Tb content 2.5%. In each figure, the graph (a) is for the first magnetic layer thickness of 200 Å and graph (b) for 800 Å; in each graph, the thickness of the intermediate layer 15 is plotted along the abscissa and the C/N ratio along the ordinate. As can be seen from FIGS. 31 and 32, with the lower Tb content of the first magnetic layer 1 (x=23%), a C/N ratio higher than 55 dB was not obtained even if the thickness of the first magnetic layer 1 or the intermediate layer 15 was changed; by contrast, with the higher Tb content (x=25%), good results were obtained by increasing the thickness of the intermediate layer 15.

To verify the above results, the dependence of the magneto-optical recording medium (two samples $S_{23}$ and $S_{25}$ marked with arrow in FIGS. 31 and 32) on the external magnetic field was closely examined when the thickness $t_1$ of the first magnetic layer 1 was 300 Å and the thickness of the intermediate layer 15 was 50 Å. The samples $S_{23}$ and $S_{25}$ differ only in the Tb content of the first magnetic layer 1, and therefore, the difference in the dependence on external magnetic field shown in FIGS. 33 and 34 is thought to be related to the difference in the Tb content of the first magnetic layer 1.

Figure 33A:
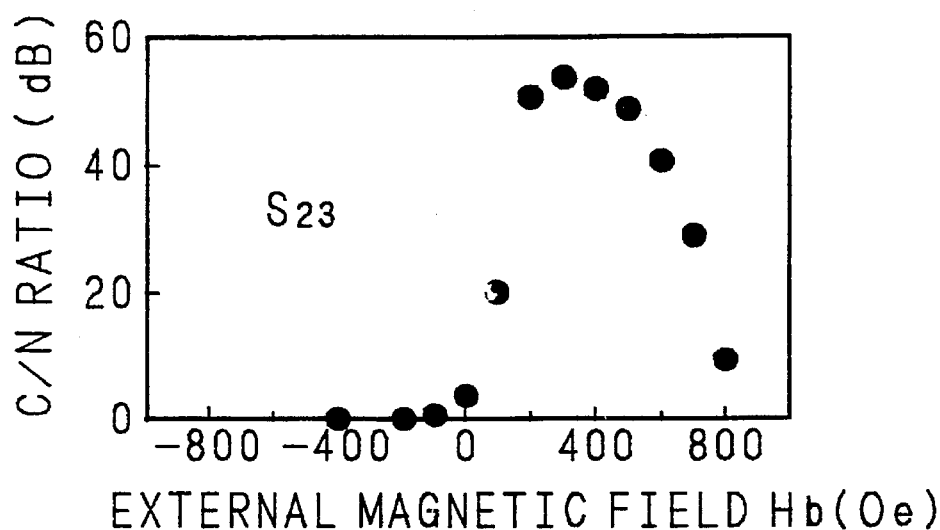
FIG. 33(a) is a graph showing the relationship between the C/N ratio and the external magnetic field strength for a recording medium sample $S_{23}$ in the case of ordinary overwriting.
Figure 34A:
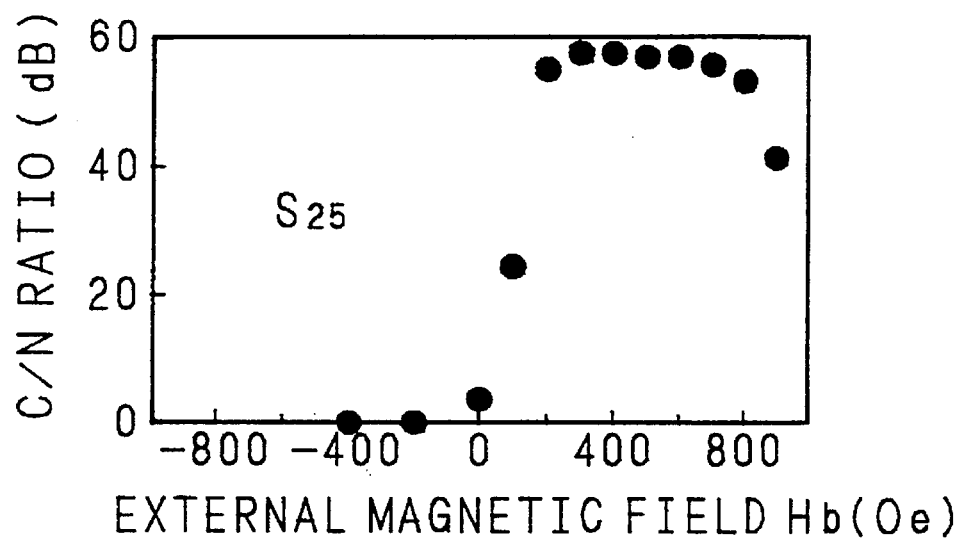
FIG. 34(a) is a graph showing the relationship between the C/N ratio and the external magnetic field strength for a recording medium sample $S_{25}$ in the case of ordinary overwriting.

FIGS. 33(a) and 34(a) show the magnetic field characteristics during ordinary overwriting when a signal of 1 MHz was written over a recorded signal of 1.3 MHz and the C/N ratio of the reproduced signal at 1 MHz was measured. The recording was performed with the linear velocity set at 5.7 m/s, and $P_{HIGH}$ and $P_{LOW}$ were chosen to give the greatest C/N ratio at Hb=300 (Oe), the power being varied between $P_{HIGH}$ and $P_{LOW}$ for recording. $P_{READ}$ was set at 1 mW.

Figure 1:
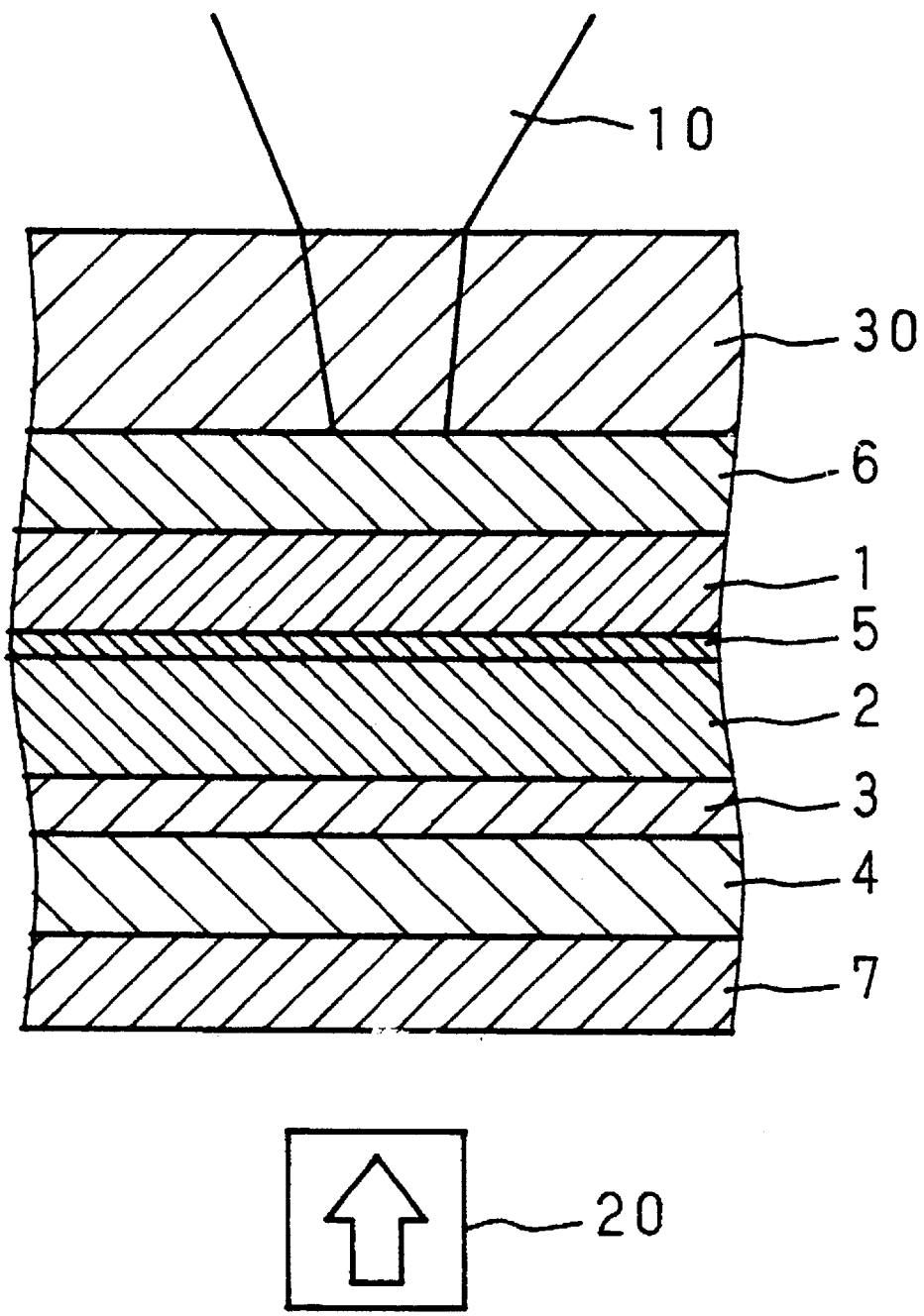
FIG. 1 is a cross sectional view showing a portion of a prior art magneto-optical recording medium.
Figure 2:
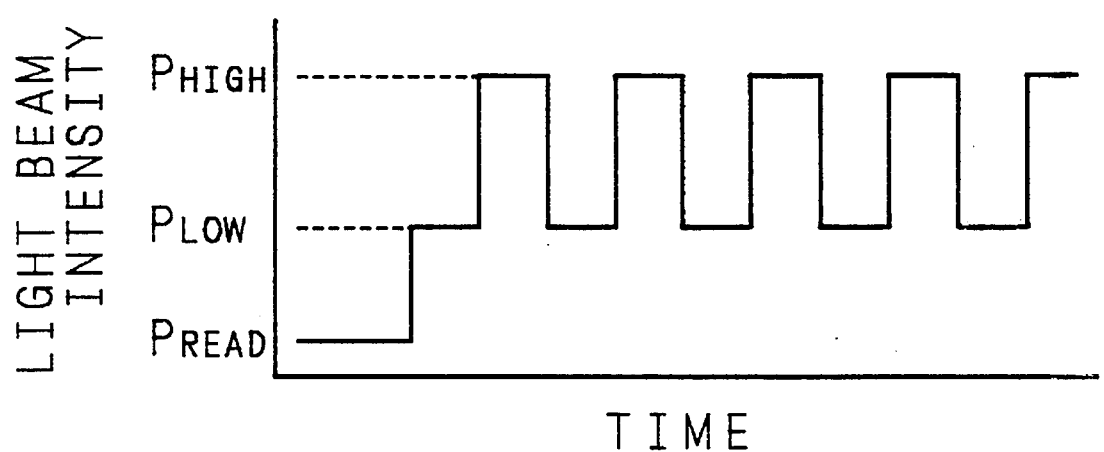
FIG. 2 is a diagram for explaining light beam intensities in recording and reproducing modes.
Figure 3:
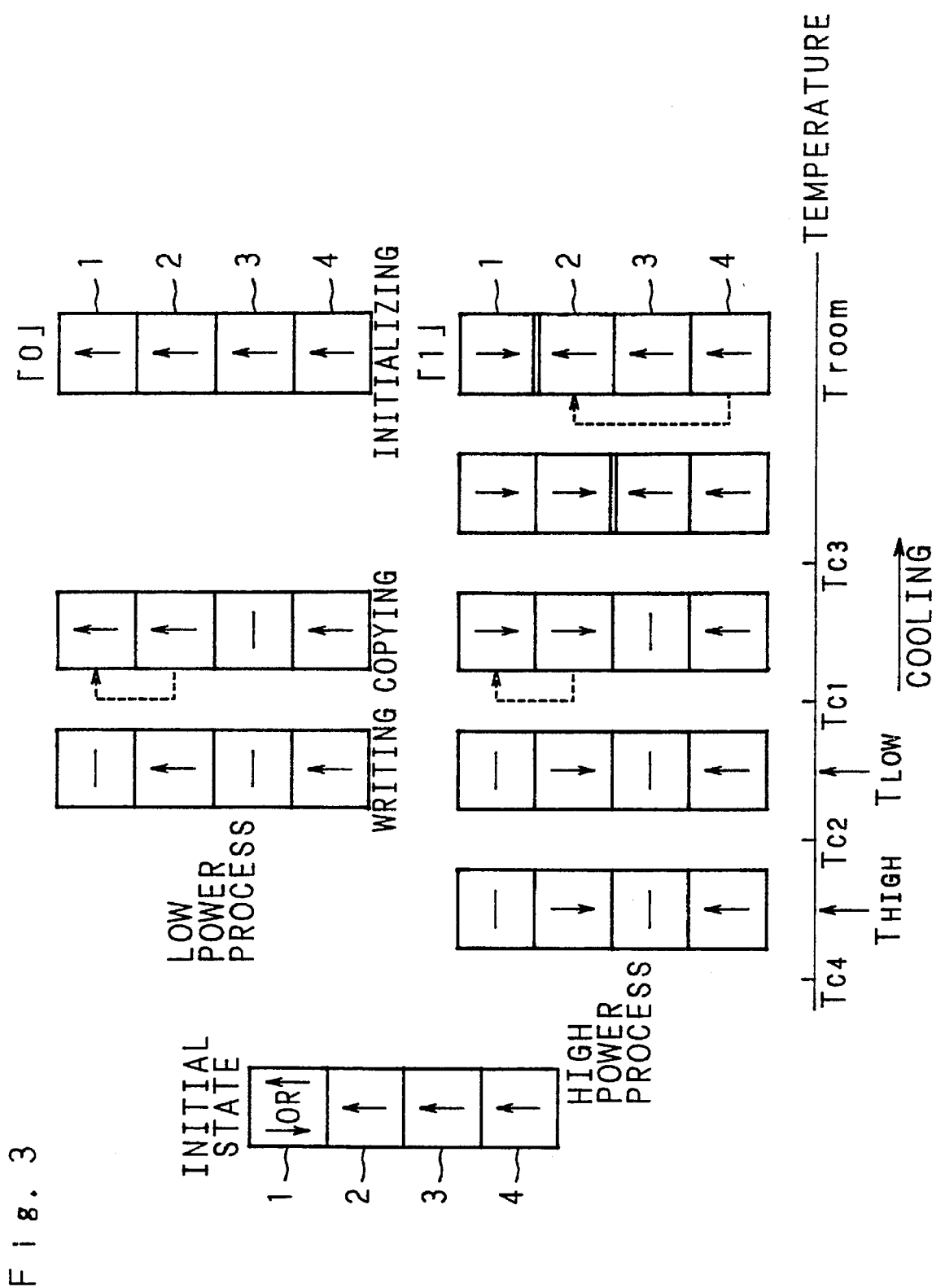
FIG. 3 is a diagram showing the relationship between temperatures and magnetization states in high power and low power modes for the magneto-optical recording medium.
Figure 4:
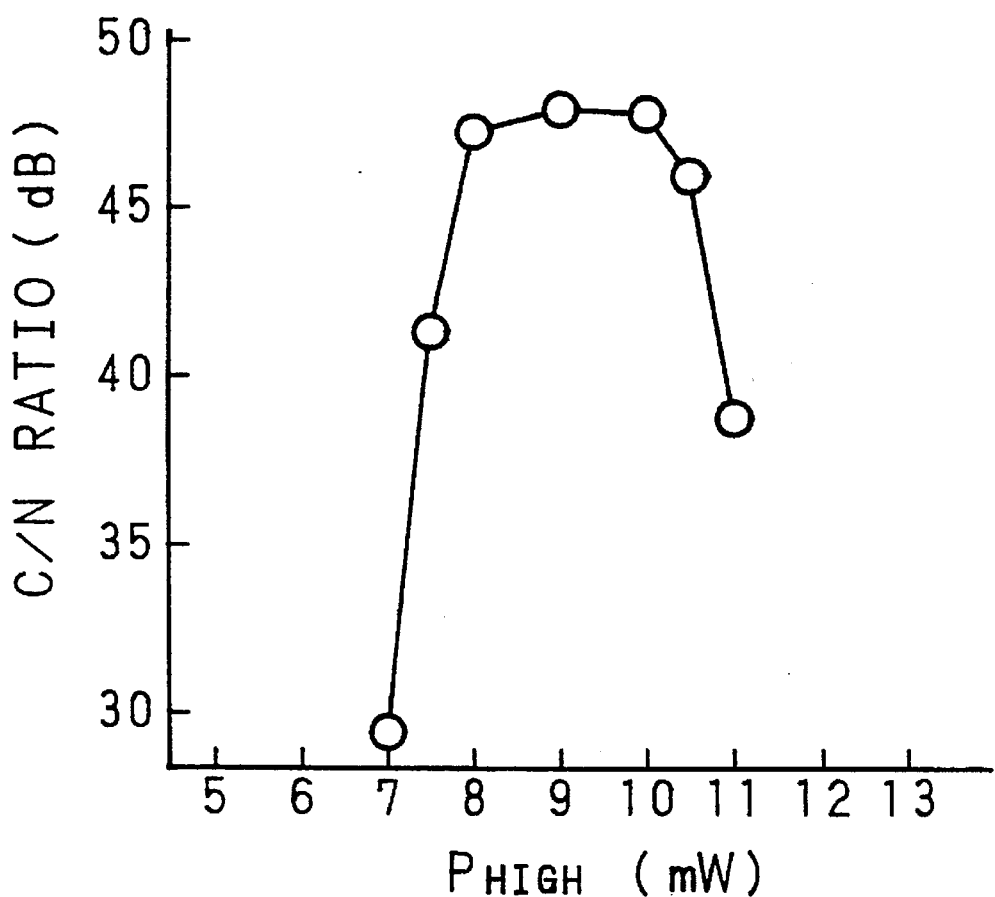
FIG. 4 is a graph showing the relationship between the C/N ratio and the recording light beam power $P_{HIGH}$ for the prior art magneto-optical recording medium.
Figure 28:
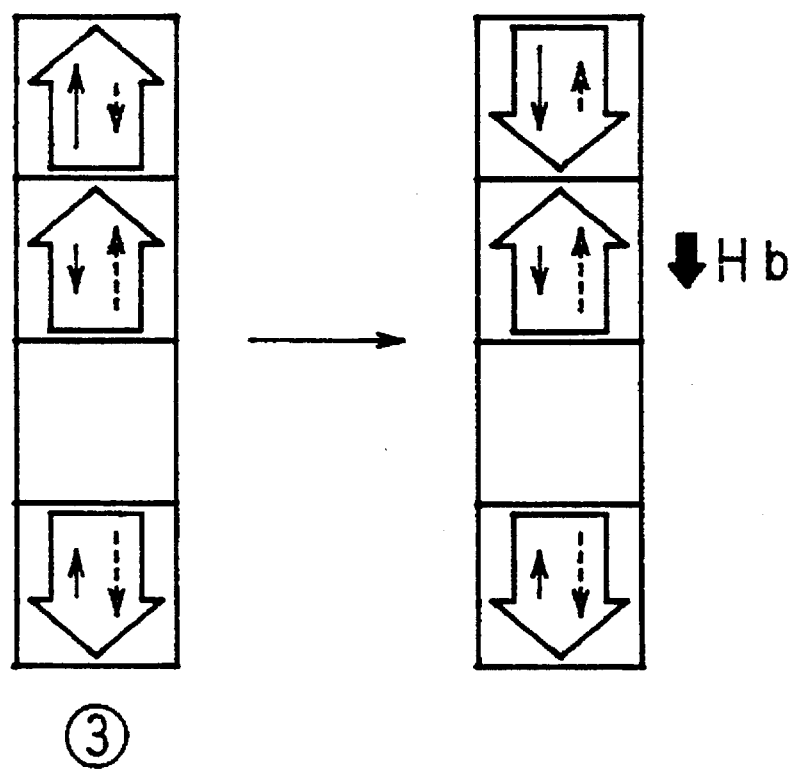
FIG. 28 is a diagram for explaining the condition for achieving the transfer of magnetization when the compensation temperature for the second magnetic layer in the magneto-optical recording medium of Embodiment 27 is high.
Figure 33B:
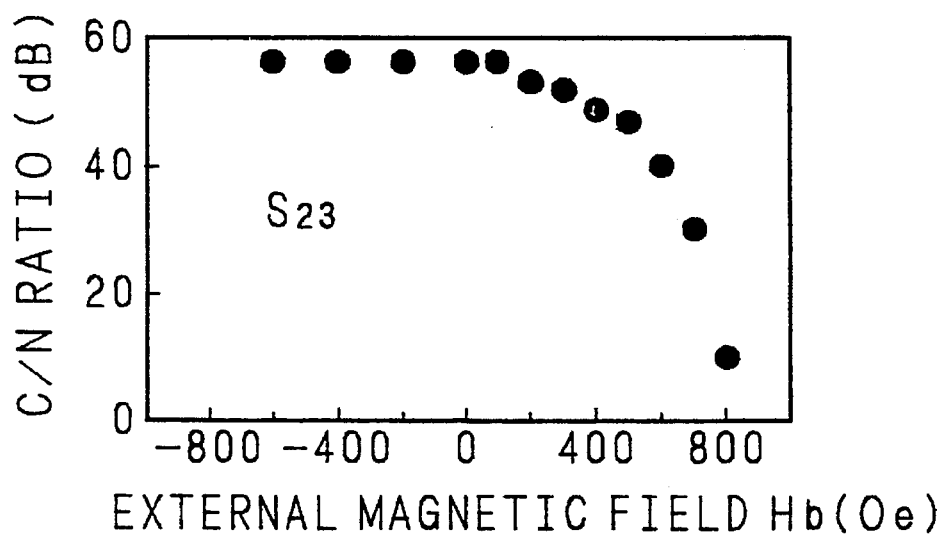
FIG. 33(b) is a graph showing the relationship between the C/N ratio and the external magnetic field strength for the recording medium sample $S_{23}$ in the case of low power recording.
Figure 34B:
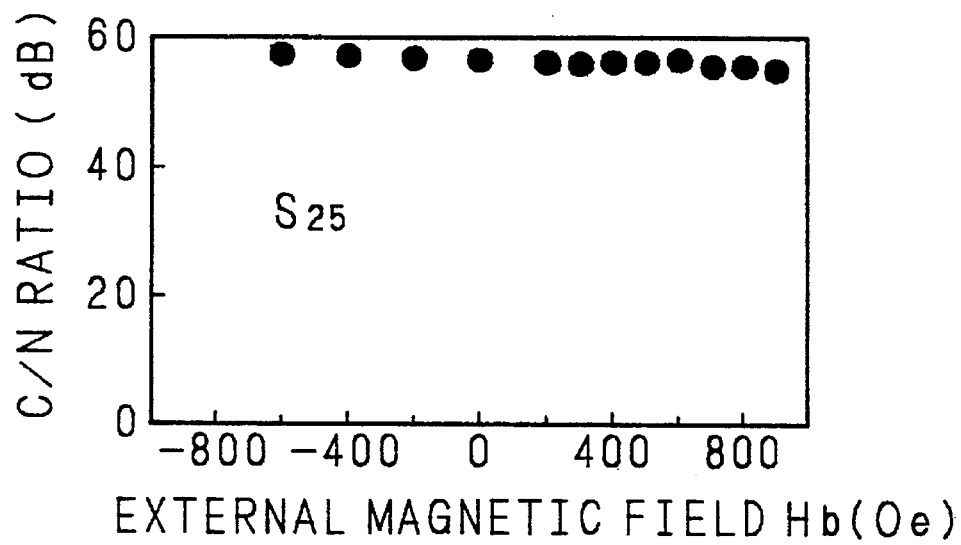
FIG. 34(b) is a graph showing the, relationship between the C/N ratio and the external magnetic field strength for a recording medium sample $S_{25}$ in the case of low power recording.
Figure 35A:
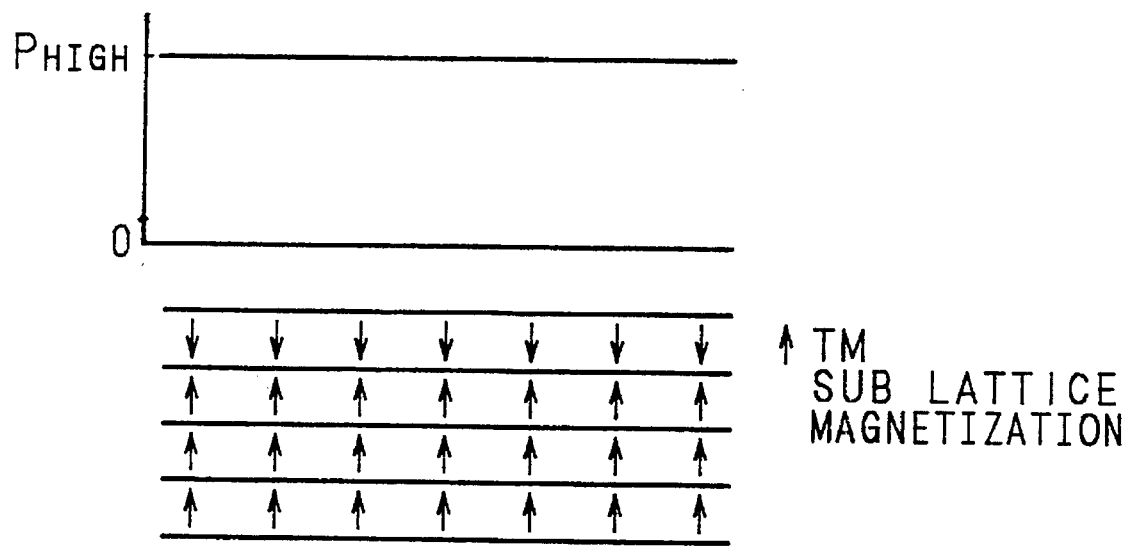
FIG. 35(a) is a schematic diagram showing the magnetization state of the recording medium after total erasure by high power.
Figure 35B:
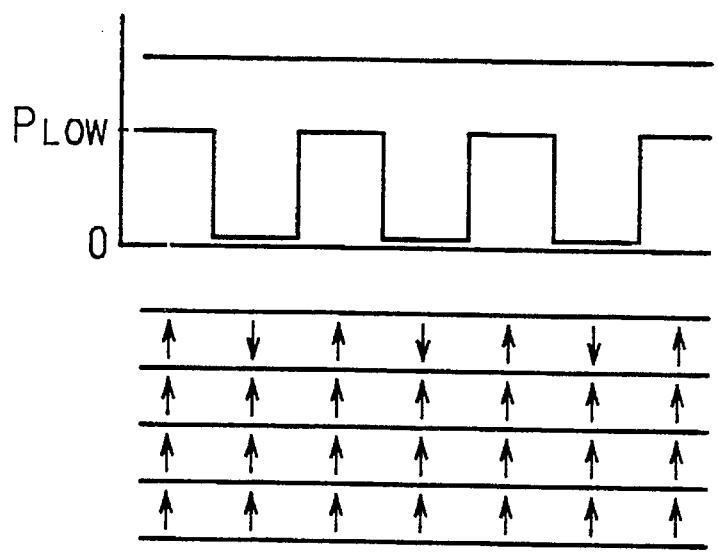
FIG. 35(b) is a schematic diagram showing the magnetization state of the recording medium after low power recording.

On the other hand, FIGS. 33(b) and 34(b) show the magnetic field characteristics during low power recording. In low power recording, the medium was first erased uniformly with high power ($P_{HIGH}$-DC) (see FIG. 35(a)), and then, the recording was performed with the laser power being varied between $P_{LOW}$ and 0. The recording frequency was 1 MHz, and $P_{HIGH}$ and $P_{LOW}$ were chosen in the same manner as for FIGS. 33(a) and 34(a). As shown in FIGS. 33(a) and 34(a), the dependence of the C/N ratio on the external magnetic field rises near Hb=0 and falls somewhere on the positive side. The rising point is determined during the writing to the second magnetic layer 2 in the high power process shown in FIG. 3. On the other hand, the condition to determine the falling point is thought to be a necessary and sufficient condition for satisfying the transfer of "0" in the low power process shown in FIG. 3, i.e. the transfer from the second magnetic layer 2 to the first magnetic layer 1. More specifically, it is the condition for achieving the transition shown in FIG. 28. In FIG. 28, the second and fourth magnetic layers 2 and 4 are shown as RE-dominant, but since reversal of magnetization does not occur in these layers during the above transition, the state, of these layers, whether RE-dominant or TM-dominant, does not affect the condition to be obtained. What matters here is the first magnetic layer. In FIG. 28, the first magnetic layer is shown as TM-dominant. At this time, the condition for the transition to satisfy is $$2M_{s1}t_1(H_{c1}+H_b)-\sigma_{w12}<0 \qquad (2)$$

That is, the condition for Hb to satisfy is $$H_b < \frac{\sigma_{w12}}{2M_{s1}t_1} - H_{c1} \qquad (3)$$

For example, the sample $S_{23}$ in FIG. 33 has a Tb content of 23%, and clearly is TM-dominant at the transfer temperature. It is therefore thought that the upper limit of the external magnetic field for overwrite is given by the right-hand side of Expression (3). Further, since Expression (3) was derived so as to satisfy the transfer of "0" in the low power process, the upper limit of the external magnetic dependence in the low power recording shown in FIG. 33(b) is also given by the right-hand side of Expression (3). From FIG. 33(b), the upper limit can be obtained as 100 (Oe). However, in FIG. 33(a), at Hb=100 (Oe) the C/N ratio has yet to rise. This means that 100 (Oe) of the external magnetic field is not strong enough for recording in the high power process. That is, for the sample $S_{23}$, there is no such external magnetic field that completely satisfies the conditions for both the recording in the high power process and the transfer of "0" in the low power process, and therefore, the C/N ratio is lower than that for the sample $S_{25}$.

On the other hand, the sample $S_{25}$ has a Tb content of 25%, and its compensation temperature is higher than that for the sample $S_{23}$. Actual measurement showed that the compensation temperature of the first magnetic layer 1 of the sample $S_{25}$ was 140° C. which is nearly equal to the temperature at which the transfer of "0" occurs. At the compensation temperature, the right-hand side of Expression (3) becomes ∞, since the total magnetization $M_{s1}=0$. That is, since the total magnetization is extremely low, there occurs almost no interaction with the external magnetic field. This clearly explains the results shown in FIG. 34(b). In this case, it can be said that the range of the external magnetic field is sufficiently wide over which both the recording in the high power process and the transfer of "0" in the lower power process can be accomplished satisfactorily. In FIG. 34(a), a drop in the C/N ratio is observed at Hb=800 (Oe). This may be related to the condition for Expression (1) given in the account of Embodiment 27. However, a practically necessary margin is sufficiently secured in the case of the sample $S_{25}$. As previously described, it is desirable that the compensation temperature of the first magnetic layer 1 be nearly equal to the temperature at which the transfer of "0" occurs. To verify this, it is sufficient to confirm that the dependence on the external magnetic field is flat in low power recording. For example, the upper limit of the external magnetic field stipulated by ISO standards is 400 (Oe); therefore, if the dependence on the external magnetic field in low power recording is flat over the range of −400 (Oe)≦Hb≦400 (Oe), it should be satisfactory for practical purposes.

Figure 36A:
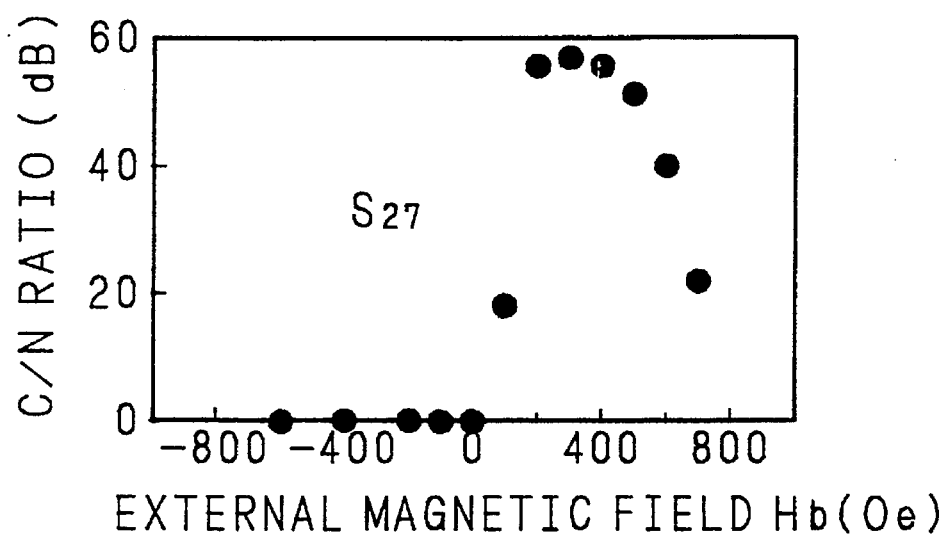
FIG. 36(a) is a graph showing the relationship between the C/N ratio and the external magnetic field strength for a recording medium sample $S_{27}$ in the case of ordinary overwriting.
Figure 36B:
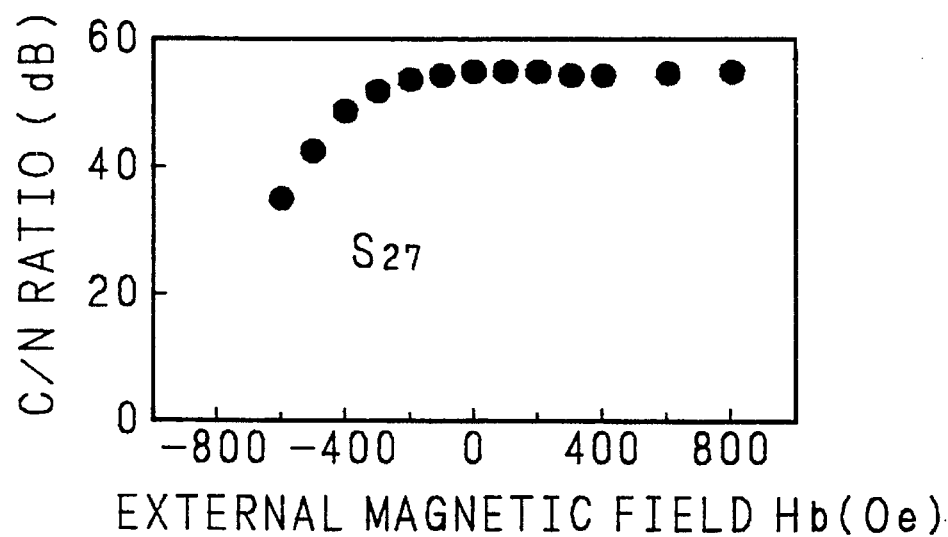
FIG. 36(b) is a graph showing the relationship between the C/N ratio and the external magnetic field strength for a recording medium sample $S_{27}$ in the case of low power recording.

When the first magnetic layer 1 is RE-dominant near the temperature that causes the transfer, the condition for the transfer is satisfied in the transfer process of "0" if the sign of Hb is positive. However, the margin for the magnetic field becomes narrow, since the same condition as defined by Expression (2) applies for the transfer of "1" in the high power process shown in FIG. 3. Further, since the sign of magnetic field interaction characteristic is reversed between RE-dominant and TM-dominant states, the magnetic field characteristic for low power recording is such that the C/N ratio degrades on the negative sign side of the magnetic field. For example, a sample $S_{27}$ was made with its first magnetic layer 1 having a Tb content of 27%, a higher content than that, for the sample $S_{23}$ or $S_{25}$, and the same measurements as described above were taken. The results are shown in FIG. 36. In FIG. 36, the variation of external magnetic field is plotted along the abscissa and the variation of C/N ratio along the ordinate, as in FIGS. 33 and 34. As can be seen from FIG. 36(a), for low power recording the C/N ratio degraded on the negative sign side of the magnetic field, the degradation manifesting itself in the overwrite recording characteristic shown in FIG. 36(a).

As is apparent from the above description, it is desirable that the first magnetic layer 1 should achieve the compensation composition near the temperature that causes the transfer of "0" (which is nearly equal to the temperature that causes the transfer of "1"). This is equivalent to the dependence of the C/N ratio on the magnetic field being flat in low power recording. For practical purposes, the dependence characteristic should be flat over the range −400 (Oe)≦Hb≦400 (Oe). The word "flat" means that the variation of C/N ratio should be approximately within the error of measurement, for example, within ±1 dB.

For samples such as $S_{28}$ for which the above characteristic is not flat, a good C/N ratio was not obtained even if other parameters were varied, as shown in FIG. 31. Other parameters mean the thickness of the first magnetic layer 1 and the thickness of the intermediate layer 15 for adjusting the exchange forces σW.

Figure 32A:
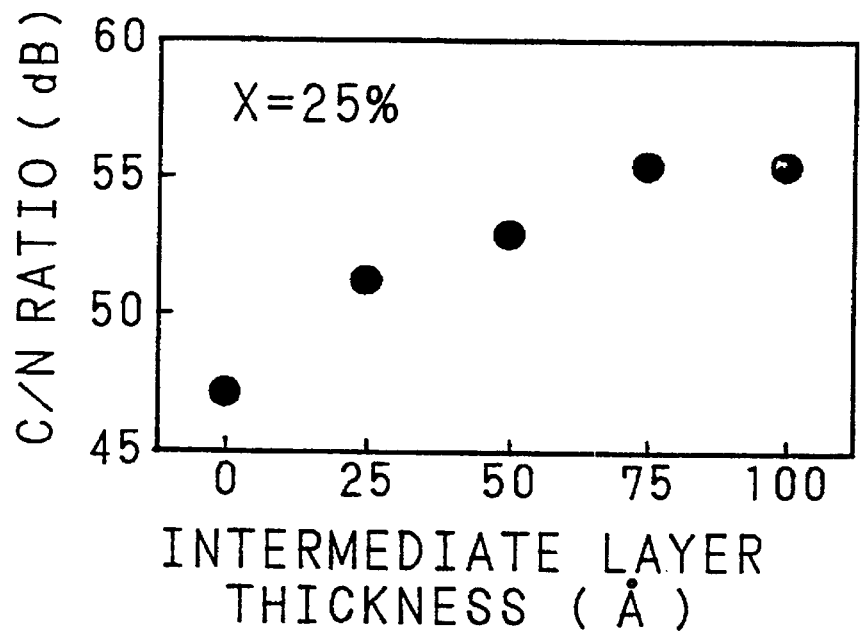
FIG. 32(a) is a graph showing the relationship between the C/N ratio and the intermediate layer thickness when the thickness of the first magnetic layer in the magneto-optical recording medium of Embodiment 30 is 200 Å and the rare earth metal content thereof is 25%.
Figure 32B:
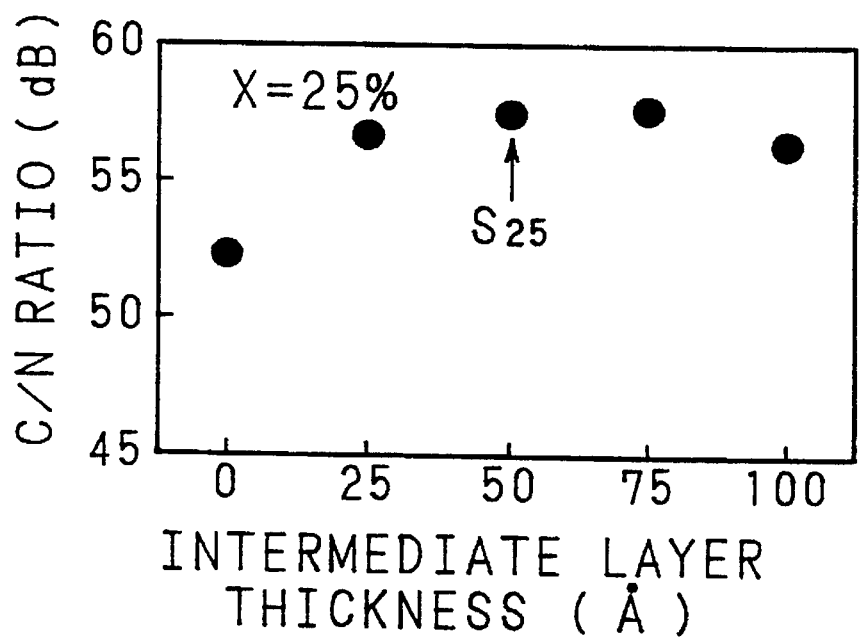
FIG. 32(b) is a graph showing the relationship between the C/N ratio and the intermediate layer thickness when the thickness of the first magnetic layer in the magneto-optical recording medium of Embodiment 30 is 300 Å and the rare earth metal content thereof is 25%.

On the other hand, for samples such as $S_{25}$ having a flat magnetic field characteristic, good results were obtained as shown in FIG. 32.

Embodiment 31

Using a magneto-optical recording medium having the layered structure shown in FIG. 24, we will now study the magnetic characteristics of the intermediate layer 15 provided to control the exchange forces between the first and second magnetic layers 1 and 2.

The detailed composition of each layer is as shown below.

Figure 37:
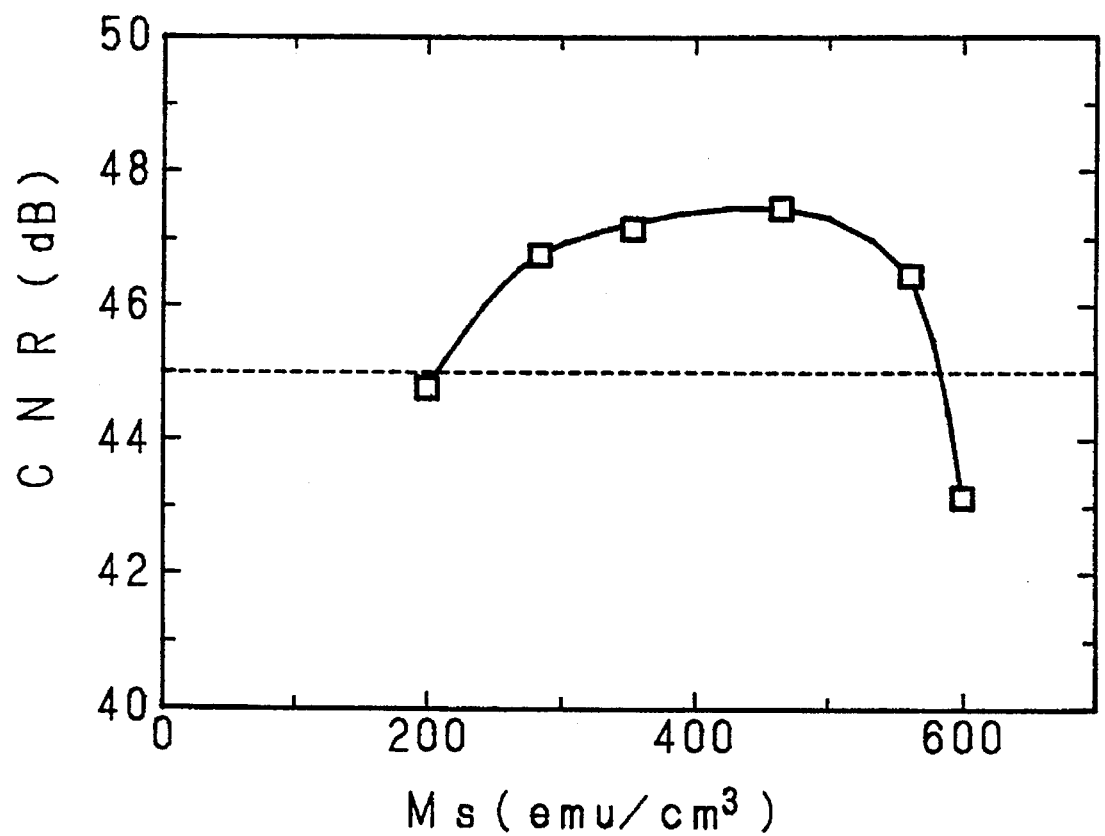
FIG. 37 is a graph showing the relationship between the C/N ratio and the saturation magnetization Ms for a fifth magnetic layer in the magneto-optical recording medium of Embodiment 31.

Substrate 30: PC substrate with 1.2 mm t groove
Dielectric layer 6: $SiN_x$
1st magnetic layer 1: TbFeCo, ternary amorphous alloy
  $Tb_{24}Fe_{72}Co_4$    Thickness: 300 Å
Intermediate layer 15: GdFeCo, ternary amorphous alloy
  $Gd_{30}Fe_{49}Co_{21}$    Thickness: 150 Å
  [Saturation magnetization Ms = 456 emu/cm$^3$]
2nd magnetic layer 2: DyFeCo, ternary amorphous alloy
  $Dy_{25}Fe_{45}Co_{30}$    Thickness: 500 Å
3rd magnetic layer 3: TbFe, binary amorphous alloy
  $Tb_{16}Fe_{84}$    Thickness: 200 Å
4th magnetic layer 4: TbCo, binary amorphous alloy
  $Tb_{30}Co_{70}$    Thickness: 400 Å
Dielectric layer (protection layer) 7: $SiN_x$ On the recording medium of the above structure, a signal of pit length 2 μm was recorded which was then overwritten with a signal of pit length 0.76 μm using a direct overwrite by light power modulation technique, with the linear velocity of 11 m/sec and applied magnetic field of 300 Oe, while varying the light beam intensity between 13 mW and 5 mW. As a result, a C/N ratio of 47 dB was obtained with an erasure ratio of 45 dB or over. FIG. 37 shows a graph plotting the C/N ratio as a function of the saturation magnetization Ms of the intermediate layer 15 when a signal of pit length 0.76 μm was recorded (recording frequency 4.93 MHz, linear velocity 7.5 m/sec). As can be seen from the graph, a good C/N ratio of 45 dB and higher was obtained over the range of the saturation magnetization Ms 200 to 550 emu/cm$^3$ The thickness of the intermediate layer 15 used was 200 Å. In other words, in the case; of an intermediate layer 15 of saturation magnetization Ms less than 200 emu/cm$^3$ the exchange forces between the first and second magnetic layers 1 and 2 cannot be controlled satisfactorily, resulting in an increased level of noise; on the other hand, in the case of an intermediate layer 15 of saturation magnetization Ms of over 550 emu/cm$^3$, the erasure ratio after direct overwrite by light power modulation recording drops because of insufficient exchange forces, thus resulting in degradation of the C/N ratio.

Figure 38:
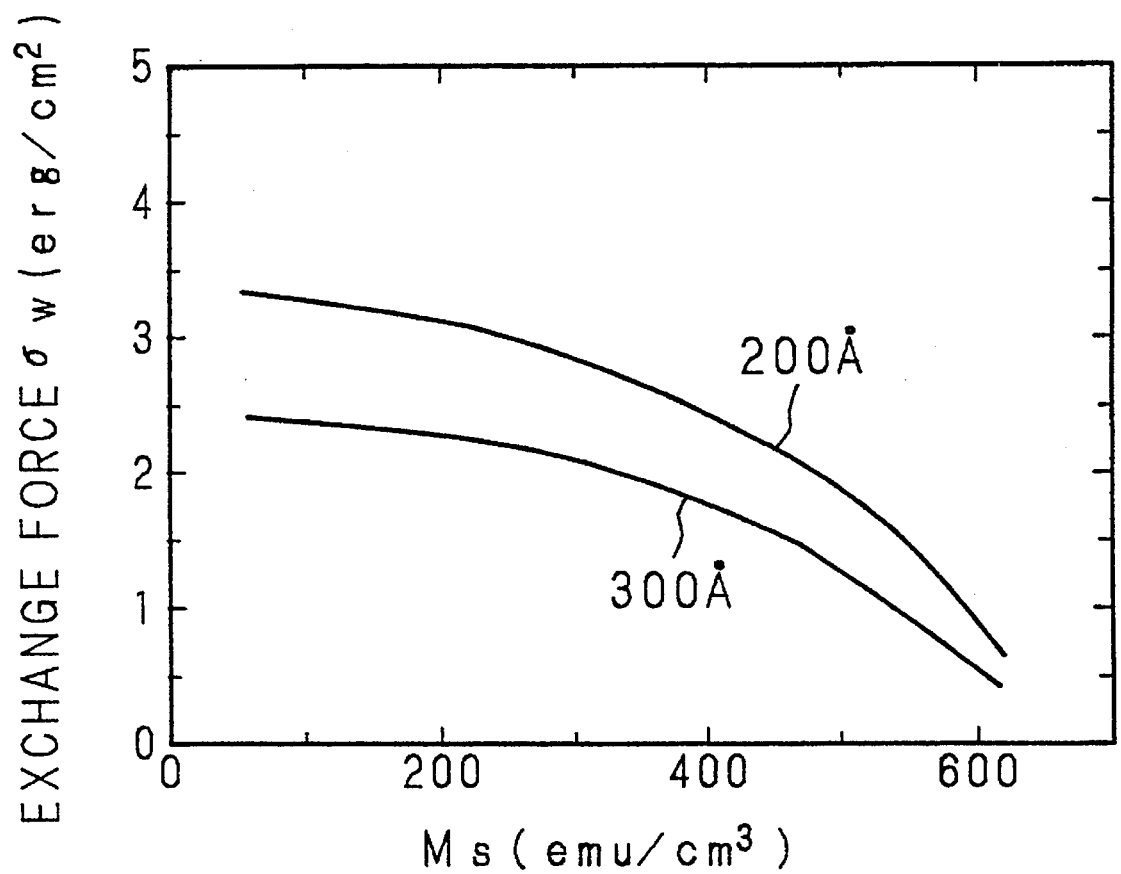
FIG. 38 is a graph showing the relationship of the C/N ratio with respect to the exchange forces between the first and second magnetic layers in the magneto-optical recording medium of Embodiment 31.

FIG. 38 shows a graph plotting the exchange forces σW acting between the first and second magnetic layers 1 and 2 at room temperature as a function of the saturation magnetism Ms of the intermediate layer 15. As shown, the exchange forces σW decrease with increasing saturation magnetization Ms and also with increasing thickness of the intermediate layer 15. This phenomenon can be explained by the decrease of the perpendicular magnetic anisotropy energy of the intermediate layer 15. It is thus apparent that the exchange forces σW acting between the first and second magnetic layers 1 and 2 at room temperature can be reduced by using an intermediate layer 15 of higher saturation magnetization or by increasing the thickness of the intermediate layer 15. If a magnetic film of low saturation magnetization is used as the intermediate layer 15, the exchange forces σW can be reduced by increasing the Film thickness, but this leads to a drop in the recording sensitivity because of the increase in the total film thickness. For example, suppose a magnetic film of saturation magnetization of the order of 200 emu/cm$^3$ is used as the intermediate layer 15. Then, the thickness of the intermediate layer 15 needs to be increased to control the exchange forces. In this case, 400 Å is the upper limit of the thickness that does not present any practical problem in terms of recording sensitivity. Accordingly, using a magnetic film of high saturation magnetization is desirable from the viewpoint of recording sensitivity, since the thickness of the intermediate layer 15 can be reduced. From the above, it can be shown that $Ms \times t < 10^{-3}$ emu/cm$^2$ is desirable for the intermediate layer 15 when the relationship between the saturation magnetization Ms and the thickness t is considered.

As is apparent from the above description, a desirable magnetic layer for controlling the exchange forces acting between the first and second magnetic layers is formed from an alloy of rare earth and transition metals, and has a rare earth sub-lattice magnetization dominant structure, with its saturation magnetization falling within the range of 200 to 550 emu/cm$^3$ at room temperature. The desirable magnetic layer has a thickness less than 400 Å and contains a rare earth element Gd as its main component and at least one or other of transition metals Fe or Co. With the thus constructed intermediate magnetic layer, the present embodiment provides a magneto-optical recording medium in which the exchange forces between the first and second magnetic layers are effectively controlled to enhance the recording and reproducing characteristics as well as productivity.

Embodiment 32

We will now study the reversal magnetic field for the first magnetic layer 1 in the magneto-optical recording medium having the structure shown in FIG. 24.

The detailed composition of each layer is described below.

In the figure, the reference numeral 30 is a glass substrate with grooves on 1.6 μm pitch; 1 is a first magnetic layer of 400 Å thickness, formed from $Tb_{24}Fe_{72}Co_4$; 2 is a second magnetic layer 2 of 700 Å thickness, formed from $Dy_{25}Fe_{45}Co_{30}$; 3 is a third magnetic layer of 200 Å thickness, formed from $Tb_{16}Fe_{82}Co_2$; 4 is a fourth magnetic layer of 400 Å, formed from $Tb_{27}Co_{73}$; 15 is an intermediate layer of 200 Å thickness, formed from $Gd_{32}Fe_{48}Co_{20}$ and interposed between the first and second magnetic layers 1 and 2 in order to control the exchange forces therebetween; and 6 and 7 are dielectric layers each of 700 Å thickness, formed from SiNx. The magnetic layers 1, 2, 3, 4, and 15 are sandwiched between the dielectric layers 6 and 7 and are coupled with each other by exchange forces acting between neighboring layers.

When Tci is the Curie temperature for the ith magnetic layer, Hci is the coercive force of the ith magnetic layer, Hwi is the exchange force being acted on the ith magnetic layer from a neighboring layer having antiparallel sub-lattice magnetic moments, and Hb is the biasing magnetic field strength, the Curie temperatures for the layers being such that Tc4>Tc2>Tc1>Tc3>Troom, the magnetic characteristics of the magneto-optical recording medium of Embodiment 32 having the above-described structure can be shown as follows:

| | |
|---|---|
| 1st magnetic layer: | Hw1 < Hc1 : ~ Troom |
| | Hw1 − Hb > Hc1 : ~ Tc1 |
| 2nd magnetic layer: | Hw2 + Hb > Hc2 : ~ Tc3 |
| | Hw2 + Hb < Hc2 : ~ Tc1 |
| 3rd magnetic layer: | Hw3 − Hb > Hc3 : ~ Tc3 |
| 4th magnetic layer: | Hw4 + Hb < Hc4 : within operating temperature |

The reversal magnetic field for the first magnetic layer 1 of this recording medium is 8.4 kOe. For a signal recorded at linear velocity of 7.5 m/sec. with recording frequency of 5 MHz, a good overwrite characteristic with the C/N ratio of over 45 dB was obtained with the biasing magnetic field of 200 Oe or over.

Figure 39:
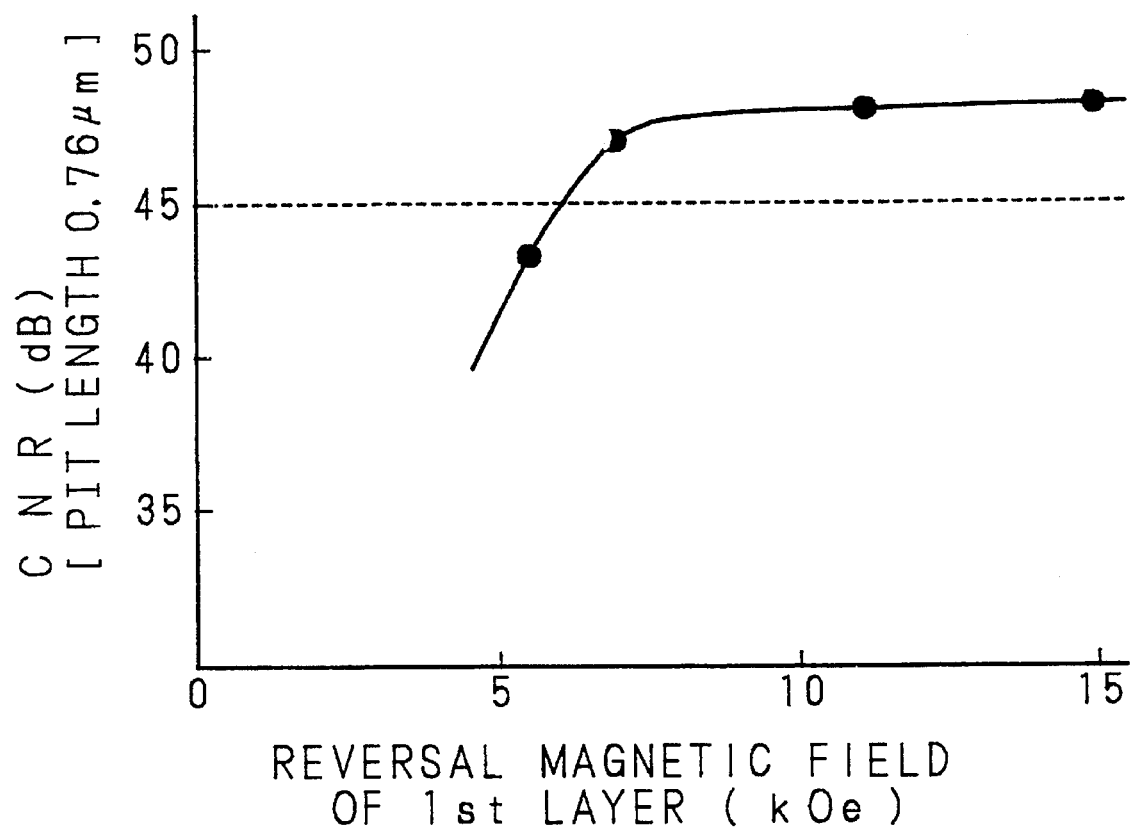
FIG. 39 is a graph showing the relationship between the C/N ratio and the reversal magnetic field for the first magnetic layer in the magneto-optical recording medium of Embodiments 32 to 34.

Next, the relationship between the recording characteristic and the reversal magnetic field for the first magnetic layer 1 was examined when the terbium content of the first magnetic layer 1 was varied. The first magnetic layer 1 used had a terbium dominant composition. The results are shown in FIG. 39. In FIG. 39, the maximum C/N ratio is plotted against the reversal magnetic field for the first magnetic layer 1. As is apparent from FIG. 39, the recording/reproducing characteristic drops as the reversal magnetic field for the first magnetic layer 1 decreases. As shown by the graph, a C/N ratio of 45 dB necessary for digital recording is obtained when the reversal magnetic field for the first magnetic layer 1 is 6 kOe or over.

Embodiment 33

In Embodiment 32, the magneto-optical recording medium comprises basically four magnetic layers plus the intermediate layer 15, but it will be recognized that the same effect as described above can be obtained for a magneto-optical recording medium comprising basically two magnetic layers with the third and fourth magnetic layers 3 and 4 omitted.

Embodiment 34

The magnetic layers 1 to 4 may be formed from ferrimagnetic materials such as GdFe, GdTbFeCo, TbDyFeCo, NdDyFeCo, TbHoCo, DyCo, etc.

Embodiment 35

Furthermore, in order to increase the carrier level, TbFeCo, GdFeCo, TbGdCo, etc. having a large Kerr rotation angle may be coupled with the first magnetic layer 1 by exchange forces prior to the formation of the first magnetic layer 1.

In any of the above embodiments, a single plate recording medium has been described which comprises a recording layer formed on a substrate, but it will be appreciated that two such single plate recording media may be bonded together using an epoxy resin, thermoplastic resin, thermosetting resin, etc. Furthermore, the recording medium may be shaped in a card-like form.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A magneto-optical recording medium for enabling direct overwrite by light power modulation with a recording means formed of plural magnetic layers on a transparent substrate, where the adjacent layers are exchange-coupled with each other, said recording means comprising:

a first magnetic layer for retaining a magnetization direction corresponding to information;

a second magnetic layer for transferring a magnetization direction thereof to the first magnetic layer, wherein the second magnetic layer is made of a rare earth-transition metal alloy whose rare earth metal content percentage is 27 at % or less;

an initializing layer for initializing the recording means being on an opposite side of the recording means from the substrate; and a resin layer formed on the initializing layer.

2. A magneto-optical recording medium according to claim 1, wherein the rare earth metal is one or two elements selected from the group consisting of Gd, Tb, and Dy.

3. A magneto-optical recording medium according to claim 1, further comprising an intermediate layer interposed between the first and second magnetic layers in order to adjust the exchange-coupling force acting therebetween.

4. A magneto-optical recording medium for enabling direct overwrite by light power modulation comprising:

first, second, third, and fourth magnetic layers having perpendicular magnetic anisotropy formed on a substrate, adjacent layers being exchange-coupled with each other, each of the magnetic layers having an associated Curie temperature, $Tc1$, $Tc2$, $Tc3$, and $Tc4$, respectively;

wherein the magnetic layers are formed such that when a temperature of the first, second, third, and fourth magnetic layers is raised to at least $Tc1$, a magnetization direction of the second magnetic layer is aligned in a direction based on external information, and when the temperature of the four magnetic layers is lowered a magnetization direction of the first magnetic layer is transferred to be aligned with the magnetization direction of the second magnetic layer by the exchange-coupling forces acting between the first and second magnetic layers, and thereafter the magnetization direction of the second magnetic layer is aligned to be initialized with a magnetization direction of the fourth magnetic layer by the exchange-coupling forces acting between the second and fourth magnetic layers, thereby enabling overwrite;

wherein the first magnetic layer comprises a rare earth-transition metal alloy and has a compensation temperature nearly equal to a temperature that causes a transfer of the magnetization direction from the second magnetic layer to the first magnetic layer; and $Tc4$ is greater than any of $Tc1$, $Tc2$, and $Tc3$.

5. A magneto-optical recording medium according to claim 4, wherein the C/N ratio is substantially constant within the range of the external magnetic field from $-400$ Oe to $400$ Oe during low power recording.

6. A magneto-optical recording medium according to claim 4, further comprising an intermediate layer interposed between the first and second magnetic layers in order to adjust the exchange-coupling force acting therebetween.

7. A magneto-optical recording medium according to claim 6, wherein the C/N ratio is substantially constant within the range of the external magnetic field from $-400$ Oe to $400$ Oe during low power recording.

8. A magneto-optical recording medium for enabling direct overwrite by light power modulation with a recording means formed of plural magnetic layers on a transparent substrate, where the adjacent layers are exchange-coupled with each other, said recording means comprising:

a first magnetic layer for retaining a magnetization direction corresponding to information said first magnetic layer having a reversal magnetic field means of not less than 6 kOe;

a second magnetic layer for transferring a magnetization direction thereof to the first magnetic layer, an initializing layer for initializing the recording means is in contact with the opposite side of the recording means from the substrate; and a resin layer formed on the initializing layer.

9. A magneto-optical recording medium according to claim 8, further comprising an intermediate layer interposed between the first and second magnetic layers in order to adjust the exchange-coupling force acting therebetween.

* * * * *

UNITED STATES PATENT AND TRADEMARK OFFICE
CERTIFICATE OF CORRECTION

PATENT : 5,593,791
DATED : January 14, 1997
INVENTOR(S) : Yoshio Fujii et al

It is certified that error appears in the above-identified patent and that said Letters Patent is hereby corrected as shown below:

In column 28, lines 28-33, should be deleted to read as follows:
--a second magnetic layer for transferring a magnetization direction thereof to the first magnetic layer; and an initializing layer for initializing the recording means, the initializing layer being on an opposite side of the recording means from the first magnetic layer; and a resin layer is formed on the initializing layer of the recording means.--.

Signed and Sealed this

Sixteenth Day of December, 1997

Attest:

BRUCE LEHMAN

Attesting Officer

Commissioner of Patents and Trademarks